United States Patent
Fukushi et al.

(10) Patent No.: US 12,312,426 B2
(45) Date of Patent: May 27, 2025

(54) COMPOSITION INCLUDING CURABLE FLUOROPOLYMER AND CURATIVE AND METHODS OF MAKING AND USING THEM

(71) Applicant: 3M INNOVATIVE PROPERTIES COMPANY, St. Paul, MN (US)

(72) Inventors: Tatsuo Fukushi, Woodbury, MN (US); Tamon Aoki, Tokyo (JP); Qilin Chan, Woodbury, MN (US); Miguel A. Guerra, Woodbury, MN (US); Klaus Hintzer, Kastl (DE); Florian D. Jochum, Ingelheim (DE); Michael H. Mitchell, Woodbury, MN (US); Allen M. Sohlo, Lindstrom, MN (US); Yuta Suzuki, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 749 days.

(21) Appl. No.: 17/414,280

(22) PCT Filed: Dec. 17, 2019

(86) PCT No.: PCT/US2019/066767
§ 371 (c)(1),
(2) Date: Jun. 15, 2021

(87) PCT Pub. No.: WO2020/131824
PCT Pub. Date: Jun. 25, 2020

(65) Prior Publication Data
US 2022/0073664 A1    Mar. 10, 2022

Related U.S. Application Data

(60) Provisional application No. 62/780,735, filed on Dec. 17, 2018.

(51) Int. Cl.
*C08F 214/26* (2006.01)

(52) U.S. Cl.
CPC ...... *C08F 214/262* (2013.01); *C08F 2800/10* (2013.01); *C08F 2810/20* (2013.01)

(58) Field of Classification Search
CPC .. C08F 214/00; C08F 214/18; C08F 214/262; C08F 2810/20
See application file for complete search history.

(56) References Cited

U.S. PATENT DOCUMENTS

| | | |
|---|---|---|
| 4,349,650 A | 9/1982 | Krespan |
| 5,268,405 A | 12/1993 | Ojakaar |
| 5,285,002 A | 2/1994 | Grootaert |
| 5,442,097 A | 8/1995 | Obermeier |
| 5,565,512 A | 10/1996 | Saito |
| 5,621,145 A | 4/1997 | Saito |
| 5,700,879 A | 12/1997 | Yamamoto |
| 5,767,204 A | 6/1998 | Iwa |
| 5,891,965 A | 4/1999 | Worm |
| 6,191,208 B1 | 2/2001 | Takahashi |
| 6,613,941 B1 | 9/2003 | Felix |
| 6,703,461 B1* | 3/2004 | Tanaka ..................... C08F 14/18 526/250 |
| 6,706,193 B1 | 3/2004 | Burkard |
| 6,720,360 B1 | 4/2004 | Grootaert |
| 6,794,550 B2 | 9/2004 | Hintzer |
| 6,803,425 B2 | 10/2004 | Hintzer |
| 6,833,403 B1 | 12/2004 | Bladel |
| 6,992,143 B2 | 1/2006 | Wang |
| 7,018,541 B2 | 3/2006 | Hintzer |
| 7,488,781 B2 | 2/2009 | Xu |
| 7,566,762 B2 | 7/2009 | Otsuka |
| 8,541,499 B2 | 9/2013 | Hintzer |
| 8,906,821 B2 | 12/2014 | Grootaert |
| 10,557,031 B2 | 2/2020 | Aoki |
| 2004/0044139 A1 | 3/2004 | Grootaert et al. |
| 2005/0113507 A1* | 5/2005 | Bladel ........................ C08J 3/03 524/544 |
| 2005/0143529 A1 | 6/2005 | Grootaert |
| 2009/0221758 A1 | 9/2009 | Shimizu et al. |
| 2012/0065321 A1* | 3/2012 | Grootaert .............. C08F 214/18 525/200 |
| 2013/0281607 A1* | 10/2013 | Hintzer ................... C02F 1/461 524/544 |
| 2014/0011933 A1* | 1/2014 | Shefelbine .......... C08F 214/184 524/413 |

(Continued)

FOREIGN PATENT DOCUMENTS

| | | |
|---|---|---|
| CN | 108350244 A | 7/2018 |
| EP | 2601226 | 6/2013 |

(Continued)

OTHER PUBLICATIONS

Wang, "Perfluoroelastomer and fluoroelastomer seals for seminconductor wafer processing equipment", Journal of Fluorine Chemistry, 2003, vol. 122, pp. 113-119.

(Continued)

*Primary Examiner* — Robert C Boyle
(74) *Attorney, Agent, or Firm* — Kathleen B. Gross; Julie Lapos-Kuchar

(57) ABSTRACT

The composition includes a curable fluoropolymer having nitrogen-containing cure sites and a curative including an organo onium cation and an anion represented by Formula (I) or Formula (II). The composition is free of metal cations or has not more than 20 parts per million metal cations and free of silicon dioxide or has less than 0.5 percent by weight silicon dioxide, based on the total weight of the composition. In some cases, the composition consists of the curable fluoropolymer and the curative. Shaped articles including the composition, a fluoroelastomer prepared by curing the composition, a method of making a fluoroelastomer article, and a process for making the composition are also described.

19 Claims, No Drawings

(56) References Cited

U.S. PATENT DOCUMENTS

2015/0291714 A1* 10/2015 Hintzer .................. C08L 27/18
526/240
2016/0115294 A1    4/2016 Grootaert

FOREIGN PATENT DOCUMENTS

| WO | WO 2010-151610 | 12/2010 |
| WO | WO 2019-215636 | 11/2019 |

OTHER PUBLICATIONS

International Search report for PCT International Application No. PCT/US2019/066767 mailed on Apr. 20, 2020, 4 pages.

* cited by examiner

COMPOSITION INCLUDING CURABLE FLUOROPOLYMER AND CURATIVE AND METHODS OF MAKING AND USING THEM

CROSS-REFERENCE TO RELATED APPLICATION

This application is a national stage filing under 35 U.S.C. 371 of PCT/US2019/066767, filed Dec. 17, 2019, which claims priority to U.S. Provisional Application No. 62/780,735, filed Dec. 17, 2018, the disclosure of which is incorporated by reference in its entirety herein.

BACKGROUND

Fluoroelastomers are known to have excellent mechanical properties, heat resistance, weather resistance, and chemical resistance, for example. Such beneficial properties render fluoroelastomers useful, for example, as O-rings, seals, hoses, skid materials, and coatings (e.g., metal gasket coating for automobiles) that may be exposed to elevated temperatures or corrosive environments. Fluoroelastomers have been found useful in the automotive, chemical processing, semiconductor, aerospace, and petroleum industries, among others.

In the field of production of semiconductors, reduction of cost of semiconductor chips has been advanced rapidly because of high integration and enhancement of yield, and as a result, a sealing material used on semiconductor production apparatuses is required to have low levels of metal components, total organic carbon (TOC), and particles and not to release them in the semiconductor production apparatuses. Methods for reducing the metal content of a fluorine-containing elastomer are described in U.S. Pat. No. 6,703,461 (Tanaka et al.).

Silica filler is known to improve fluoroelastomer properties, e.g., compression set. See, e.g., U.S. Pat. No. 6,992,143 (Wang). Also, silica filler works as a desiccant to provide stability for catalysts used for curing fluoroelastomers containing nitrile cure sites.

SUMMARY

In one aspect, the present disclosure provides a composition that includes a curable fluoropolymer having nitrogen-containing cure sites and a curative including an organo onium cation and an anion represented by Formula I or Formula II

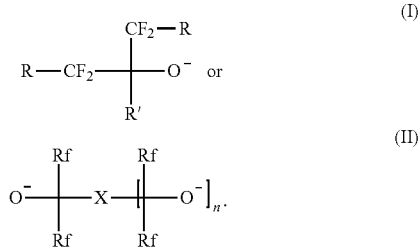

The composition is free of metal cations or has not more than 20 parts per million metal cations and free of silicon dioxide or has less than 0.5 percent by weight silicon dioxide, based on the total weight of the composition.

In another aspect, the present disclosure provides a composition consisting of a curable fluoropolymer having nitrogen-containing cure sites and a curative including an organo onium cation and an anion represented by Formula I or Formula II

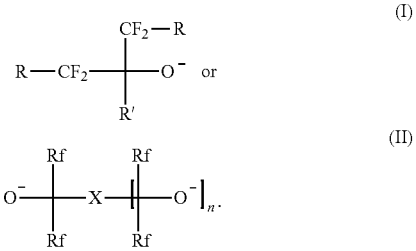

In another aspect, the present disclosure provides a composition consisting of a curable fluoropolymer having nitrogen-containing cure sites, a partially crystalline fluoropolymer filler, and a curative including an organo onium cation and an anion represented by Formula I or Formula II

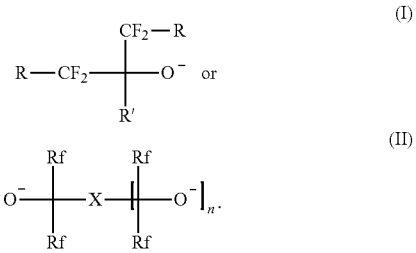

In Formulas I and II, each R and R' is independently hydrogen, halogen, alkyl, aryl, arylalkylenyl, or alkylarylenyl, wherein the alkyl, aryl, arylalkylenyl, or alkylarylenyl each may be unsubstituted or each may be substituted by one or more halogens, with the proviso that R' is not halogen, or R and R' can join together to form a ring; each Rf is $RCF_2$— or a perfluoroalkyl group having up to 8 carbon atoms; X is an organic linking group that is nonfluorinated or at least partially fluorinated; and n is 1 or 2. In some embodiments, the curable fluoropolymer is an amorphous, curable fluoropolymer with nitrogen-containing cure sites, which may be nitrile cure sites.

In another aspect, the present disclosure provides a shaped article including the fluoropolymer composition.

In another aspect, the present disclosure provides a fluoroelastomer prepared by curing the composition.

In another aspect, the present disclosure provides a method of making a fluoroelastomer article. The method includes providing the composition disclosed herein, shaping the composition, and crosslinking the composition to form the fluoroelastomer article.

In another aspect, the present disclosure provides a process for making the composition disclosed herein. The process includes providing an aqueous composition containing particles of the curable fluoropolymer, contacting the aqueous composition with a mineral acid, isolating the curable fluoropolymer; and combining the curable fluoropolymer with the curative. Typically and advantageously, the curative does not include a silicon dioxide carrier.

In this application:

Terms such as "a", "an" and "the" are not intended to refer to only a singular entity but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

"Alkyl group" and the prefix "alk-" are inclusive of both straight chain and branched chain groups and of cyclic groups having up to 30 carbons (in some embodiments, up to 20, 15, 12, 10, 8, 7, 6, or 5 carbons) unless otherwise specified. Cyclic groups can be monocyclic or polycyclic and, in some embodiments, have from 3 to 10 ring carbon atoms.

"Alkylene" is the multivalent (e.g., divalent or trivalent) form of the "alkyl" groups defined above.

"Arylalkylene" refers to an "alkylene" moiety to which an aryl group is attached.

"Alkylarylene" refers to an "arylene" moiety to which an alkyl group is attached.

The term "aryl" as used herein includes carbocyclic aromatic rings or ring systems, for example, having 1, 2, or 3 rings and optionally containing at least one heteroatom (e.g., O, S, or N) in the ring and optionally substituted by up to five substituents including one or more alkyl groups having up to 4 carbon atoms (e.g., methyl or ethyl), alkoxy having up to 4 carbon atoms, halo (i.e., fluoro, chloro, bromo or iodo), hydroxy, or nitro groups. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl.

The term "perfluoroalkyl group" includes linear, branched, and/or cyclic alkyl groups in which all C—H bonds are replaced by C—F bonds.

The terms "cure" and "curable" joining polymer chains together by covalent chemical bonds, usually via crosslinking molecules or groups, to form a network polymer. Therefore, in this disclosure the terms "cured" and "crosslinked" may be used interchangeably. A cured or crosslinked polymer is generally characterized by insolubility but may be swellable in the presence of an appropriate solvent.

All numerical ranges are inclusive of their endpoints and nonintegral values between the endpoints unless otherwise stated.

DETAILED DESCRIPTION

The composition of the present disclosure is free of metal cations or comprises not more than 20 parts per million metal cations. In some embodiments, the composition comprises not more than 15 ppm, not more than 10 ppm, not more than 5 ppm, or not more than 1 ppm metal cations. It is desirable to avoid metal cations since metal cations may be undesired impurities in many end-use applications, for example, in the electronic, semiconductor, optical, medical and pharmaceutical industries. The composition desirably is free of alkaline earth metal ions, alkali metal ions, and aluminum ions or may contain them in amounts of not more than 20 ppm, not more than 15 ppm, not more than 10 ppm, not more than 5 ppm, or not more than 1 ppm. The level of alkaline- and alkaline-earth-ions (Na, K, Li, Ca, Mg, Ba) and Al may be individually below 1 ppm and in total not more than 4 ppm. Other ions like Fe, Ni, Cr, Cu, Zn, Mn, Co may be in total less than 4 ppm. For the purposes of this disclosure, metal cation content is determined by ICP using the method in the Examples, below.

The low content of metal cations in the composition of the present disclosure can be achieved by polymerizing one or more fluoromonomers in the absence of metal salt-containing initiators, emulsifiers, buffers, and coagulants or by removing these compounds from the aqueous dispersion including fluoropolymers obtained by the polymerization process. For the composition of the present disclosure, it is also useful to select metal-free acid acceptors, coagents and fillers, if such additives are desired.

Common acid acceptors used in fluoropolymer compositions include magnesium oxide, lead oxide, calcium oxide, calcium hydroxide, dibasic lead phosphite, zinc oxide, barium carbonate, strontium hydroxide, calcium carbonate, hydrotalcite, alkali stearates, magnesium oxalate, silicon dioxide, or combinations thereof, and these acid acceptors can be avoided in the compositions of the present disclosure. Useful alternative acid acceptors that can be used in the composition of the present disclosure include strong organic bases.

The composition of the present disclosure is free of silicon dioxide or comprises less than 0.5 percent by weight (wt. %) silicon dioxide, based on the total weight of the composition. In some embodiments, the composition comprises not more than 0.1 wt. %, not more than 0.05 wt. %, not more than 0.01 wt. %, or not more than 0.001 wt. % silicon dioxide, based on the weight of the composition. Silicon dioxide, which is commonly used as a filler in fluoroelastomers can be detrimental in some applications. For example, silicon dioxide reacts with highly reactive fluorine-containing species (e.g., F and $CF_2$ radicals) generated during plasma chemical deposition or etching from fluorine containing gases ($NF_3$ or $CF_4$). Silicon tetrafluoride ($SiF_4$) gas can be formed when silicon dioxide reacts with such fluorine-containing species. This reaction can contribute to degradation or weight loss of fluoroelastomers. The curative useful in the composition of the present disclosure is also free of silicon dioxide (e.g., as a carrier) or comprises less than 0.5 percent by weight (wt. %) silicon dioxide, based on the total weight of the composition. In some embodiments, the curative comprises not more than 0.1 wt. %, not more than 0.05 wt. %, not more than 0.01 wt. %, or not more than 0.001 wt. % silicon dioxide, based on the weight of the composition. The percent silicon dioxide can be determined by wavelength disperse X-ray fluorescence using the method in the Examples, below.

The fluoropolymer in the composition of the present disclosure is a curable fluoropolymer comprising nitrogen-containing cure sites. In some embodiments, the composition includes an amorphous, curable fluoropolymer having nitrogen-containing cure sites. Amorphous, curable fluoropolymers may have a glass-transition temperature ($T_g$) of less than 26° C., or less than 20° C., or less than 0° C. For example, the curable fluoropolymer useful in the compositions of the present disclosure may have a Tg within the range of from about −160° C. to about +19° C., for example a Tg between −40° C. and up to 12° C., or between −50° C. and +15° C., or between −55° C. and +19° C. In some embodiments, amorphous fluoropolymers have a glass-transition temperature between −160° C. and −40° C. Amorphous fluoropolymers may have a Mooney viscosity (ML 1+10 at 121° C.) of from about 2 to about 150, for example from 10 to 100, or from 20 to 70. The curable fluoropolymers may have an onset of cure (Ts2) of less than 1 minute at 180° C.

Suitable amorphous fluoropolymers having nitrogen-containing cure sites typically comprise interpolymerized monomer units derived from at least one, more typically at least two, principal monomers and a nitrogen-containing monomer. Examples of suitable principal monomers include perfluoroolefins (e.g., tetrafluoroethylene (TFE) and hexafluoropropylene (HFP), or any perfluoroolefin of the formula $CF_2=CF-Rf$, where Rf is fluorine or a perfluoroalkyl of 1 to 8, in some embodiments 1 to 3, carbon atoms), halogenated fluoroolefins (e.g., trifluorochloroethylene (CTFE)), perfluorovinyl ethers (e.g., perfluoroalkyl vinyl ethers (PAVE) and perfluoroalkoxyalkyl vinyl ethers (PAAVE)), and hydrogen-containing monomers such as olefins (e.g., ethylene, propylene, or another non-fluorinated alpha-olefin such as a $C_2$ to $C_9$ alpha olefin) and partially fluorinated olefins (e.g., vinylidene fluoride (VDF), pentafluoropropylene, trifluoroethylene, or an olefin in which less than half or less than one-fourth of the hydrogen atoms are replaced with fluorine). Examples of such amorphous fluoropolymers include, for example, those referred to in the art as "fluoroelastomer gums" and "perfluoroelastomer gums". In some embodiments, the fluoropolymer comprises interpolymerized units of tetrafluoroethylene and at least one of a different perfluorinated olefin, a partially fluorinated olefin, a non-fluorinated olefin, a perfluoroalkylvinylether, or a perfluoroalkoxyalkylvinylether. Those skilled in the art are capable of selecting specific interpolymerized units at appropriate amounts to form an amorphous fluoropolymer.

In some embodiments, halogen- or hydrogen-containing olefins useful as monomers in the amorphous, curable fluoropolymer include those of the formula $CX_2=CX-R$, wherein each X is independently hydrogen, fluoro, or chloro and R is hydrogen, fluoro, or a $C_1$-$C_{12}$, in some embodiments $C_1$-$C_3$, alkyl, with the proviso that not all X and R groups are fluoro groups. In some embodiments, polymerized units derived from non-fluorinated olefin monomers are present in the amorphous fluoropolymer at up to 25 mole percent of the fluoropolymer, in some embodiments up to 10 mole percent or up to 3 mole percent.

Suitable perfluorinated ethers include PAAVE of the formula $CF_2=CF-ORf$, wherein Rf is a linear, branched, or cyclic perfluorinated alkyl group optionally containing ether linkages, and $CF_2=CF(OC_nF_{2n})_pORf$, wherein Rf is a perfluorinated ($C_1$-$C_8$) alkyl group optionally containing ether linkages, each n is independently 1 to 4, and p is 1 to 6. When more than one $CF_2a$ group is present, n may be independently selected. However, within a $C_nF_2a$ group, a person skilled in the art would understand that n is not independently selected. $C_nF_2a$ may be linear or branched. In some embodiments, $(OC_nF_{2n})_z$ is represented by $-O-(CF_2)_{1-4}-[O(CF_2)_{1-4}]_{0-1}$. Such perfluorinated ethers are described, for example, in U.S. Pat. Nos. 6,255,536 and 6,294,627 (each to Worm et al.) Examples of suitable PAAVE include $CF_2=CFOCF_2OCF_3$, $CF_2=CFOCF_2OCF_2CF_3$, $CF_2=CFOCF_2CF_2OCF_3$, $CF_2=CFOCF_2CF_2CF_2OCF_3$, $CF_2=CFOCF_2CF_2CF_2CF_2OCF_3$, $CF_2=CFOCF_2CF_2OCF_2CF_3$, $CF_2=CFOCF_2CF_2CF_2OCF_2CF_3$, $CF_2=CFOCF_2CF_2CF_2CF_2OCF_2CF_3$, $CF_2=CFOCF_2CF_2OCF_2OCF_3$, $CF_2=CFOCF_2CF_2OCF_2CF_2OCF_3$, $CF_2=CFOCF_2CF_2OCF_2CF_2CF_2OCF_3$, $CF_2=CFOCF_2CF_2OCF_2CF_2CF_2CF_2OCF_3$, $CF_2=CFOCF_2CF_2(OCF_2)_3OCF_3$, $CF_2=CFOCF_2CF_2(OCF_2)_4OCF_3$, $CF_2=CFOCF_2CF_2OCF_2OCF_2OCF_3$, $CF_2=CFOCF_2CF_2OCF_2CF_3CF_2=CFOCF_2CF_2OCF_2$ $CF_2OCF_2CF_2CF_3$, $CF_2=CFOCF_2CF(CF_3)-O-C_3F_7$ (PPVE-2), $CF_2=CF(OCF_2CF(CF_3))_2-O-C_3F_7$ (PPVE-3), and $CF_2=CF(OCF_2CF(CF_3))_3-O-C_3F_7$ (PPVE-4). Examples of suitable PAVE include perfluoro(methyl vinyl) ether $CF_2=CFOCF_3$, perfluoro(ethyl vinyl) ether $CF_2=CFOCF_2CF_3$, and perfluoro(n-propyl vinyl) ether $CF_2=CFOCF_2CF_2CF_3$. Mixtures of PAVE and PAAVE may also be employed.

In addition, the amorphous, curable fluoropolymers may include interpolymerized units of fluoro (alkene ether) monomers, including those described in U.S. Pat. No. 5,891,965 (Worm et al.) and U.S. Pat. No. 6,255,535 (Schulz et al.). Such monomers include those represented by formula $CF_2=CFCF_2(OC_nF_2\sim)_pORf$, wherein n, p, and Rf are as defined above in any of their embodiments. Examples of suitable fluoro (alkene ether) monomers include perfluoroalkoxyalkyl allyl ethers such as $CF_2=CFCF_2OCF_2CF_2OCF_3$, $CF_2=CFCF_2OCF_2CF_2CF_2OCF_3$, $CF_2=CFCF_2OCF_2OCF_3$, $CF_2=CFCF_2OCF_2OCF_2CF_3$, $CF_2=CFCF_2OCF_2CF_2CF_2CF_2OCF_3$, $CF_2=CFCF_2OCF_2CF_2OCF_2CF_3$, $CF_2=CFCF_2OCF_2CF_2CF_2OCF_2CF_3$, $CF_2=CFCF_2OCF_2CF_2CF_2CF_2OCF_2CF_3$, $CF_2=CFCF_2OCF_2CF_2OCF_2OCF_3$, $CF_2=CFCF_2OCF_2CF_2OCF_2CF_2OCF_3$, $CF_2=CFCF_2OCF_2CF_2OCF_2CF_2CF_2OCF_3$, $CF_2=CFCF_2OCF_2CF_2OCF_2CF_2CF_2CF_2OCF_3$, $CF_2=CFCF_2OCF_2CF_2OCF_2CF_2CF_2CF_2CF_2OCF_3$, $CF_2=CFCF_2OCF_2CF_2(OCF_2)_3OCF_3$, $CF_2=CFCF_2OCF_2CF_2(OCF_2)_4OCF_3$, $CF_2=CFCF_2OCF_2CF_2OCF_2OCF_2OCF_3$, $CF_2=CFCF_2OCF_2CF_2OCF_2CF_3$, $CF_2=CFCF_2OCF_2CF_2OCF_2CF_2OCF_2CF_3$, $CF_2=CFCF_2OCF_2CF(CF_3)-O-C_3F_7$, and $CF_2=CFCF_2(OCF_2CF(CF_3))_2-O-C_3F_7$. Many of these perfluoroalkoxyalkyl allyl ethers can be prepared, for example, according to the methods described in U.S. Pat. No. 4,349,650 (Krespan). Also, perfluoropropyl allyl ether ($CF_2=CF-CF_2-OC_3F_7$) and perfluoromethoxy ethyl allyl ether ($CF_2=CF-CF_2-OC_2F_4OCF_3$) can be prepared according to the methods described in U.S. Pat. No. 5,891,965 (Worm). Perfluoroalkoxyalkyl allyl ethers can also be prepared by combining first components comprising at least one of $CF_2=CF-CF_2-OSO_2Cl$ or $CF_2=CF-CF_2-OSO_2CF_3$, a polyfluorinated compound comprising at least one ketone or carboxylic acid halide or combination thereof, and fluoride ion. Polyfluorinated compounds comprising at least one ketone or carboxylic acid halide or combination thereof and fluoride ions can be any of those described, for example, in U.S. Pat. No. 4,349,650 (Krespan).

Perfluorinated ethers are typically liquids and may be pre-emulsified with an emulsifier before its copolymerization with the other comonomers, for example, addition of a gaseous fluoroolefin. In some embodiments, polymerized units derived from at least one of PAVE or PAAVE monomers are present in the amorphous fluoropolymer at up to 50 mole percent of the fluoropolymer, in some embodiments up to 30 mole percent or up to 10 mole percent.

If the curable fluoropolymer is perhalogenated, in some embodiments perfluorinated, typically at least 50 mole percent (mol %) of its interpolymerized units are derived from TFE and/or CTFE, optionally including HFP. The balance of the interpolymerized units of the amorphous fluoropolymer (e.g., 10 to 50 mol %) is made up of one or more perfluoroalkyl vinyl or allyl ethers and/or perfluoroalkoxyalkyl vinyl allyl ethers, and a nitrogen-containing cure site monomer. If the fluoropolymer is not perfluorinated, it typically contains from about 5 mol % to about 90 mol % of its interpolymerized units derived from TFE, CTFE, and/or HFP; from about 5 mol % to about 90 mol % of its interpolymerized units derived from VDF, ethylene, and/or propylene; up to about 40 mol % of its interpolymerized units derived from a vinyl ether; and from about 0.1 mol % to about 5 mol %, in some embodiments from about 0.3 mol % to about 2 mol %, of a nitrogen-containing cure site monomer.

Examples of curable fluoropolymers useful for practicing the present disclosure include a TFE/propylene copolymer, a TFE/propylene/VDF copolymer, a VDF/HFP copolymer, a TFE/VDF/HFP copolymer, a TFE/perfluoromethyl vinyl ether (PMVE) copolymer, a TFE/$CF_2$=$CFOC_3F_7$ copolymer, a TFE/$CF_2$=$CFOCF_3$/$CF_2$=$CFOC_3F_7$ copolymer, a TFE/ethyl vinyl ether (EVE) copolymer, a TFE/butyl vinyl ether (BVE) copolymer, a TFE/EVE/BVE copolymer, a VDF/$CF_2$=$CFOC_3F_7$ copolymer, an ethylene/HFP copolymer, a TFE/HFP copolymer, a CTFE/VDF copolymer, a TFE/VDF copolymer, a TFE/VDF/PMVE/ethylene copolymer, and a TFE/VDF/$CF_2$=$CFO(CF_2)_3OCF_3$ copolymer, each of which copolymers may also contain a monomeric unit having a nitrogen-containing cure site.

In some embodiments, the molar ratio of units derived from TFE comonomer units to comonomer units derived from the perfluoroalkyl vinyl or allyl ethers or perfluoroalkoxyalkyl vinyl or allyl ethers described above may be, for example, from 1:1 to 4:1, wherein the unsaturated ethers may be used as single compounds or as combinations of two or more of the unsaturated ethers. Typical compositions comprise from 44-62 wt. % TFE and 38-56 wt. % PMVE and from 0.1-10% wt. nitrile-containing cure site monomers and from 0-10% wt. of other comonomers or modifiers with the amount of ingredients being selected such that the total amount is 100% wt. Other typical compositions comprise from about 22-30 wt. % TFE, 30-38 wt. % VDF, 34-42 wt. % HFP and from 0.1-10% wt. nitrile-containing cure site monomers and from 0-10% wt. of other comonomers or modifiers with the amount of ingredients being selected such that the total amount is 100% wt.

Nitrogen-containing cure sites enable curing the fluoropolymer to form the fluoroelastomer. At least one cure site component of at least one fluoropolymer comprises a nitrogen-containing group. Examples of monomers comprising nitrogen-containing groups useful in preparing fluoropolymers comprising a nitrogen-containing cure sites include free-radically polymerizable nitriles, imidates, amidines, amides, imides, and amine-oxides. Mixtures of any of these nitrogen-containing cure sites may be useful in the fluoropolymer compositions according to the present disclosure. Useful nitrogen-containing cure site monomers include nitrile-containing fluorinated olefins and nitrile-containing fluorinated vinyl ethers, for example, $CF_2$=$CFO(CF_2)_LCN$, $CF_2$=$CFO(CF_2)_qOCF(CF_3)CN$, $CF_2$=$CFO[CF_2CF(CF_3)O]_q(CF_2O)_yCF(CF_3)CN$, or $CF_2$=$CF[OCF_2CF(CF_3)]_rO(CF_2)_tCN$, wherein L is in a range from 2 to 12; u is in a range from 2 to 6; q is in a range from 0 to 4; y is in a range from 0 to 6; r is in a range from 1 to 2; and t is in a range from 1 to 4. Examples of such monomers include $CF_2$=$CFO(CF_2)_3OCF(CF_3)CN$, perfluoro(8-cyano-5-methyl-3,6-dioxa-1-octene), and $CF_2$=$CFO(CF_2)_5CN$.

Nitrogen-containing cure sites can also be incorporated into the curable fluoropolymer by employing selected chain transfer agents (e.g., $I(CF_2)_dCN$ in which d is 1 to 10 or 1 to 6) or by carrying out the free-radical polymerization in the presence of a perfluorosulfinate such as $NC(CF_2)_dSO_2G$, in which G represents a hydrogen atom or a cation with valence of 1 or 2.

The nitrogen-containing monomer, chain transfer agent, and/or initiator typically makes up about 0.1 to 5 mole percent (in some embodiments, 0.3 to 2 mole percent) of the polymerization components.

The curable fluoropolymer presently disclosed is typically prepared by a sequence of steps, which can include polymerization, coagulation, washing, and drying. In some embodiments, an aqueous emulsion polymerization can be carried out continuously under steady-state conditions. For example, an aqueous emulsion of monomers (e.g., including any of those described above), water, emulsifiers, buffers and catalysts can be fed continuously to a stirred reactor under optimum pressure and temperature conditions while the resulting emulsion or suspension is continuously removed. In some embodiments, batch or semibatch polymerization is conducted by feeding the aforementioned ingredients into a stirred reactor and allowing them to react at a set temperature for a specified length of time or by charging ingredients into the reactor and feeding the monomers into the reactor to maintain a constant pressure until a desired amount of polymer is formed. After polymerization, unreacted monomers are removed from the reactor effluent latex by vaporization at reduced pressure. The curable fluoropolymer can be recovered from the latex by coagulation.

The polymerization is generally conducted in the presence of a free radical initiator system, such as ammonium persulfate, potassium permanganate, AIBN, or bis(perfluoroacyl) peroxides. In some embodiments, polymerization is initiated with an initiator system selected from a combination of a fluoroaliphatic sulfinate and an oxidizing agent capable of oxidizing the sulfinate to a sulfonyl radical and/or a combination of a free radical initiator and a chloride salt. The resulting fluoropolymer is essentially free of ionic end groups. Example of oxidizing agents include free radical initiators, e.g. a persulfate, a permanganic acid or a salt thereof such as potassium permanganate. Chloride salt such as a chloride salt of the formula: M'Cl, wherein M' represents a mono- or multi-valent cation and n corresponds to the valence of the cation. Suitable cations M' include organic and inorganic cations, in some embodiments, ammonium. Examples of ammonium chloride salts include tetraalkyl ammonium chlorides such as tetrabutyl ammonium chloride as well as $NH_4Cl$. Generally, by increasing the amount of chloride salt, the number of ionic end groups reduces. Generally, the amount of chloride salt is selected such that the molar ratio of chloride ions to initiator (e.g. permanganate) is between 1:0.1 and 0.1:10, preferably between 1:0.5 and 0.1:5.

By the term 'essentially free of ionic end groups' is meant that the fluoroelastomer is free of ionic end groups or contains ionic end groups in such an amount that the absorbance ratio determined by calculating the integrated peak intensity within the range of 1840 $cm^{-1}$-1620 $cm^{-1}$ to the integrated peak intensity in the range 2740 $cm^{-1}$-2220 $cm^{-1}$ in a Fourier-transform infrared spectrum of the fluoropolymer is less than 0.1. This absorbance ratio is usually used in the art to indicate the level of carboxylic end groups (U.S. Pat. No. 6,114,452).

An alternative method to obtain a fluoropolymer essentially free of ionic end groups involves the use of a combination of a fluoroaliphatic sulfinate (e.g., a perfluoroaliphatic sulfinate) and an oxidizing agent capable of oxidizing the sulfinate to a sulfonyl radical as disclosed in U.S. Pat. No. 5,285,002 (Grootaert). Suitable oxidizing agents include a persulfate such as ammonium persulfate. The sodium salt of hydroxy methane sulfinic acid (sold under the trade designation "RONGALIT", BASF Chemical Company, New Jersey, USA) may also be used in combination with an oxidizing agent.

The fluoroaliphatic sulfinate typically will correspond to the following formula: $R_fSO_2M$, wherein $R_f$ represents a monovalent fluoroaliphatic radical having, for example, from 1 to 20 carbon atoms, in some embodiments, 4 to 10 carbon atoms, M represents a hydrogen atom or cation with valence x, which is 1 to 2, in some embodiments, 1. Examples of cations include ammonium cations.

Other methods of producing fluoropolymers may be used, for example those without using any fluorinated emulsifiers and without fluorinated sulfinates, for example those described in European Patent Application No EP 2 601 226 A1 or polymerizations with organic peroxides as known in the art, for example, using ammonium peroxodisulfates or combinations of organic and inorganic oxidizing agents.

The amount of initiator employed in an aqueous emulsion polymerization is typically between 0.01 and 2% by weight, preferably between 0.03 and 1% by weight based on the total weight of the polymerization mixture. The full amount of initiator may be added at the start of the polymerization or the initiator can be added to the polymerization in a continuous way during the polymerization until a conversion of 70 to 80% is achieved. One can also add part of the initiator at the start and the remainder in one or separate additional portions during the polymerization.

Additionally, to generate polymers with a low amount of ionic endgroups, perfluoro peresters can be used as initiators.

Most of these initiators and the emulsifiers described below have an optimum pH-range where they show most efficiency. For this reason, buffers are sometimes useful. Buffers include phosphate, acetate or carbonate buffers or any other acid or base, such as ammoniam hydroxides. The concentration range for the initiators and buffers can vary from 0.01% to 5% by weight based on the aqueous polymerization medium. The polymerization reaction may further include other components such as chain transfer agents and complexing agents. The polymerization is generally carried out at a temperature in a range from 10° C. and 100° C., or in a range from 30° C. and 80° C. The polymerization pressure is usually in the range of 0.3 MPa to 30 MPa, and in some embodiments in the range of 2 MPa and 20 MPa. If desired, such as for improved processing, the presence of strong polar end groups such as $SO_3^{(-)}$ and $COO^{(-)}$ can be reduced through known post treatments (e.g., decarboxylation, post-fluorination). Chain transfer agents of any kind can significantly reduce the number of ionic or polar end groups.

When conducting emulsion polymerization, perfluorinated or partially fluorinated emulsifiers may be useful. Polymer particles produced with a fluorinated emulsifier typically have an average diameter, as determined by dynamic light scattering techniques, in range of about 10 nanometers (nm) to about 300 nm, and in some embodiments in range of about 50 nm to about 200 nm. If desired, the emulsifiers can be removed or recycled from the fluoropolymer latex as described in U.S. Pat. No. 5,442,097 to Obermeier et al., U.S. Pat. No. 6,613,941 to Felix et al., U.S. Pat. No. 6,794,550 to Hintzer et al., U.S. Pat. No. 6,706,193 to Burkard et al. and U.S. Pat. No. 7,018,541 Hintzer et al. In some embodiments, the polymerization process may be conducted with no emulsifier (e.g., no fluorinated emulsifier). Polymer particles produced without an emulsifier typically have an average diameter, as determined by dynamic light scattering techniques, in a range of about 40 nm to about 500 nm, typically in range of about 10 nm and about 400 nm, in some embodiments, 40 nm to 250 nm, and suspension polymerization will typically produce particles sizes up to several millimeters.

In the preparation of the curable fluoropolymer useful for practicing the present disclosure, it is desirable that no perfluoroalkanoic acid or salt thereof is used, but one or more "alternative fluorinated emulsifiers", which is described in greater detail below, may be used. Typically, the total amount of alternative fluorinated emulsifiers used in the aqueous emulsion polymerization may be between 0.1% by weight and 5% by weight based on the weight of fluoropolymer to be produced.

The fluoropolymers useful for practicing the present disclosure can be prepared without using perfluorinated alkanoic acid emulsifiers as described below to keep their content low. In some embodiments, one or more alternative fluorinated acids or their salts may be used. Therefore, the polymers may contain alternative fluorinated emulsifiers. However, the amount of alternative emulsifiers is desirably also kept low such that the compositions are essentially free of such emulsifiers. Alternative fluorinated alkanoic ether acids and salts include those that correspond to the general formula:

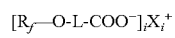

$$[R_f\text{—O-L-COO}^-]_iX_i^+$$

wherein L represents a linear or branched or cyclic partially fluorinated alkylene (alkanediyl) group or an aliphatic hydrocarbon group, $R_f$ represents a linear or branched, partially or fully fluorinated aliphatic group or a linear or branched partially or fully fluorinated group interrupted once or more than once by an ether oxygen atom, $X_i^+$ represents a cation having the valence i and i is 1, 2 and 3. Preferably, the molecular weight of the emulsifier is less than 1,500 g/mol. Specific examples are described in, for example, U.S. Pat. Publ. No. 2007/0015937 (Hintzer et al.). Examples of such emulsifiers include: $CF_3CF_2CH_2OCF_2CH_2OCF_2COOH$ and $CF_3O(CF_2)_3OCHFCF_2COOH$, $CHF_2(CF_2)_5COOH$.

In some embodiments, the molecular weight of the emulsifier, in some embodiments, a partially fluorinated emulsifier, is less than 1500, 1000, or even 500 grams/mole. Typically, the alternative fluorinated emulsifier acids and their salts have from 4 to 19 carbon atoms, in some embodiments, from 5 to 14 or from 6 to 12 carbon atoms.

The use of one or more non-fluorinated emulsifiers, or a combination of alternative fluorinated emulsifiers and non-fluorinated emulsifiers, is also possible. Examples for polymerizations of fluoropolymers with non-fluorinated emulsifiers are described, for example, in U.S. Pat. No. 7,566,762.

When carrying out polymerization, the chain transfer agents having the cure site and/or the cure site monomers can be fed into the reactor by batch charge or continuously feeding. Because feed amount of chain transfer agent and/or cure site monomer is relatively small compared to the monomer feeds, continuous feeding of small amounts of chain transfer agent and/or cure site monomer into the reactor can be achieved by blending the nitrogen-containing monomer or chain transfer agent in one or more monomers. Examples of monomers useful for such a blend include HFP and PMVE.

Adjusting, for example, the concentration and activity of the initiator, the concentration of each of the reactive monomers, the temperature, the concentration of the chain transfer agent, and the solvent using techniques known in the art can control the molecular weight of the amorphous fluoropolymer. In some embodiments, curable fluoropolymers useful for practicing the present disclosure have weight average molecular weights in a range from 10,000 grams per mole to 200,000 grams per mole. In some embodiments, the weight average molecular weight is at least 15,000, 20,000, 25,000, 30,000, 40,000, or 50,000 grams per mole up to 100,000, 150,000, 160,000, 170,000, 180,000, or up to 190,000 grams per mole. Curable fluoropolymers disclosed herein typically have a distribution of molecular weights and compositions. Weight average molecular weights can be measured, for example, by gel permeation chromatography (i.e., size exclusion chromatography) using techniques known to one of skill in the art.

The process for making the composition of the present disclosure includes isolating the curable fluoropolymer. Isolating the curable fluoropolymer from an aqueous composition including fluoropolymer particles (e.g., a reaction product from the polymerization described above) can include coagulating, washing, and drying the curable fluoropolymer.

To coagulate the obtained curable fluoropolymer latex, any coagulant which is commonly used for coagulation of a fluoropolymer latex may be used, and it may, for example, be an acid (e.g., nitric acid, hydrochloric acid or sulfuric acid) or a water-soluble organic liquid (e.g., alcohol or acetone). Water soluble salts (e.g., calcium chloride, magnesium chloride, aluminum chloride or aluminum nitrate), which are also useful coagulants, can be avoided to obtain the not more than 20 ppm metal cations that are desirable in the composition of the present disclosure. The amount of the coagulant to be added may be in range of 0.001 to 20 parts by mass, for example, in a range of 0.01 to 10 parts by mass per 100 parts by mass of the amorphous fluoropolymer latex. Alternatively, or additionally, the curable fluoropolymer latex may be frozen for coagulation. The coagulated fluoropolymer can be collected by filtration and washed with water. The washing water may, for example, be ion exchanged water, pure water or ultrapure water. The amount of the washing water may be from 1 to 5 times by mass to the fluoropolymer, whereby the amount of the emulsifier attached to the fluoropolymer can be reduced. Drying the curable fluoropolymer can then be carried out at ambient temperature or at an elevated temperature, for example, in a range from 50° C. to 150° C. or 75° C. to 125° C. Drying can be carried out at ambient pressure or reduced pressure.

In some embodiments of the process of making the composition and the composition resulting therefrom, the aqueous compositions comprising the curable fluoropolymer is brought to a lower pH, in some embodiments, to below pH 4.0. Adjusting the pH can be carried out using one or more mineral acids (e.g., HCl or HNO$_3$) to avoid introducing metal cations. The pH adjustment, if necessary, may be carried out before subjecting the fluoropolymer to a treatment composition containing an organic liquid(s) or may be carried out simultaneously with subjecting the fluoropolymer composition to the treatment composition. Advantageously, the addition of the acid leads to the coagulation of the polymer particles or contributes to the coagulation of the particles.

In some embodiments of the method of making the composition and the composition resulting therefrom, an aqueous composition comprising the curable fluoropolymer particles is treated with a treatment composition comprising at least one organic liquid. In some embodiments, the organic liquid contains at least one carbon atom and at least one C—H (carbon-hydrogen) bond. Suitable liquids include those having a boiling point of from 30° C. to 200° C., from 40° C. to 180° C., or from 50° C. to 150° C. Suitable organic liquids may have a melting point below 0° C. Suitable organic liquids include hydrocarbons. The hydrocarbons may be linear, branched, cyclic and may contain combinations thereof. The organic liquid may be aromatic or non-aromatic, e.g. aliphatic. Examples of suitable liquids include saturated linear, branched or cyclic hydrocarbons or mixtures thereof, including gasoline and kerosene. Other suitable organic liquids include hydrocarbons selected from hydrocarbons that contain oxygen-ether or ketone groups or combinations thereof, for example hydrocarbon ethers, hydrocarbon ether-ketones, hydrocarbon esters, hydrocarbon ketones, hydrocarbon ketone esters and combinations thereof and including homologues where one or more hydrogen atom has been replaced with a halogen atom, (e.g., fluorine or chlorine atom or combinations thereof). Other suitable organic liquids include aromatic liquids such as xylene, benzene, and toluene including fluorinated and/or chlorinated analogues and derivatives. Further suitable liquids include fluorinated hydrocarbons and fluorinated hydrocarbons that may contain further functional groups for example ether groups, nitrogen groups, hydroxy groups, ester groups and combinations thereof. In some embodiments, the at least one organic liquid comprises at least one of gasoline or a halogenated liquid including chlorinated liquids and hydrofluoroethers.

In some embodiments, the organic liquid is a hydrocarbon that may, optionally, contain one or more functional groups selected from halogen atoms, ether groups, carboxylate ester groups, phosphoric acid ester groups, phosphonic acid ester groups, sulfonic acid ester groups, sulfuric acid ester groups, nitrile groups, ketone groups, carbon-carbon double bonds, carbon-carbon triple bonds, hydroxy groups, nitrogen-containing functional groups other than nitrile groups, sulfoxide groups, anhydride groups and combinations thereof.

In some embodiments, the organic liquid is not miscible with water at ambient conditions. Miscibility is the property of substances to mix forming a homogeneous solution and is recorded in textbooks or reference books known to the person skilled in the art. If necessary, miscibility can be tested, for example, when 20 mL of the organic liquid is mixed with 20 mL of distilled water in a 100-mL beaker and stirred by a magnetic stirrer (100 rpm) for 20 minutes at ambient conditions. If 10 minutes after the stirrer had been turned off at least two phases have formed that are visible to the unaided eye, the organic liquid can be regarded as not miscible with water. Desirably, the liquids do not lead to swelling of the fluoropolymer or to a swelling of less than 5% or less than 2%. To test the swelling, 100 g of the fluoropolymer is kept in the liquid for 24 h at 20° C. The polymer is removed from the liquid by filtering off the liquid and drying the fluoropolymer at room temperature for 2 h. The fluoropolymer is weighed, and the weight increase in % corresponds to the swelling in %.

Organic nonpolar liquids might be useful for the treatment of perfluorinated fluoropolymers while more polar organic liquids may be particularly useful for treating partially fluorinated polymers. In particular with increasing amounts of hydrogen bonds in the polymer, liquids with increasing polarity may be useful.

The treatment composition may also contain water and may in fact be a dual phase or a multi-phase composition. In some embodiments, the treatment composition contains water and one or more salt and is an aqueous salt solution. In some embodiments, the treatment composition contains water and one or more acids. The concentration of acid or salts in the treatment composition and the volume of the treatment composition may be chosen such that dispersed fluoropolymer particles in the composition containing the fluoropolymer coagulate during the treatment step. Stirring and applications of appropriate temperatures and pressures may be used to achieve or support the coagulation.

In some embodiments in which the treatment composition further contains water, the water and organic liquid form distinct, separate phases. The volume ratio of water to organic liquid of the treatment composition might be such that there is an excess of organic liquid. Typical ranges include a volume ratio of water to organic liquid from 1:100 to 100:1; in some embodiments, from 1:10 to 10:1. Typically, the total amount (weight) of liquid used is at least the amount (weight) as the fluoropolymer to be treated, and in some embodiments, the amount (weight) of liquid used is (far) greater than the amount (weight) of fluoropolymer to be treated. In some embodiments, the treatment composition contains one or more salts dissolved in the water phase. Desirably, the salts contain only organic cations (e.g. ammonium cations) to keep the metal content of the polymers low. In some embodiments, the treatment composition contains one or more mineral acid dissolved in water (e.g., HCl or $HNO_3$).

The composition containing the curable fluoropolymer may be added to the treatment composition or, vice versa, the treatment composition may be added to the composition containing the curable fluoropolymer. When using a fluoropolymer dispersion, the fluoropolymer may coagulate upon contact with the treatment composition. Likewise, the dispersed or suspended fluoropolymer particles may be coagulated first (for example by treatment with salts or with one or more mineral acids) and subsequently contacted with the treatment composition. The particles may also be coagulated after contact with the treatment composition, for example by coagulation steps known in the art, including subjecting the composition to high shear forces, or low temperatures or both or adding appropriate amounts of acids such as those described above. The treatment with the composition comprising at least one organic liquid may be carried out once or multiple times.

After treatment with the treatment composition the particles may be separated, washed with water, dried and may be subjected to other work up steps. The treatment with the treatment composition can be carried out at room temperature and at ambient pressure but may also be carried out at increased temperature and/or at increased or reduced pressure. In some embodiments, contacting the fluoropolymer particles (or the composition containing them) with the treatment composition is carried out temperatures between about 15° C. and about 30° C.

Contacting the aqueous composition with a treatment composition comprising an organic solvent at least one of simultaneously with or subsequent to contacting the aqueous composition with a mineral acid may be useful, for example, for removing fluorinated acids or salts thereof. Fluorinated acids or their salts have been used as emulsifiers for the preparation of fluoropolymers. Perfluorinated alkanoic acids have been used in the past, but they are poorly biodegradable. Therefore, their use is desirably avoided or reduced, or expensive purification methods are used to contain or recycle these emulsifiers. Furthermore, the present of acid that can be extracted from a fluoropolymer can be determinantal in some industries (e.g., semiconductor industry).

The fluorinated acid and its salts that can be removed from a fluoropolymer composition with a treatment composition comprising at least one organic liquid can correspond to the general formula:

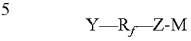

wherein Y represents hydrogen, Cl or F; $R_f$ represents a divalent linear or branched or cyclic perfluorinated or partially fluorinated saturated carbon chain typically having 4 to 18 carbon atoms wherein the carbon chain may be interrupted once or more than once by a catenary oxygen atom; Z represents an acid group. Examples of acid groups include $—COO^-$ and $—SO_3^-$ acid groups. M represents a cation including $H^+$. With the method of some embodiments of the present disclosure, the amount of an extractable fluorinated acid or its salts can be less than 5000 ppb, less than 2000 ppb, or even less than 1000 ppb (based on the weight of the fluoropolymer). It should be understood that 2000 ppb is the same as 2 ppm. In some embodiments, the composition after treatment with the treatment composition is free of fluorinated emulsifiers represented by formula $Y—R_f—Z-M$. Typically, the molecular weight of the fluorinated acid emulsifier (excluding its cation(s)), is less than 1500, 1000, or even 500 grams/mole.

In some embodiments, the fluorinated acid and its salts that can be removed from a fluoropolymer composition with a treatment composition comprising at least one organic liquid can correspond to the general formula:

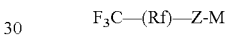

wherein Rf is a perfluorinated linear, branched or cyclic saturated carbon chain (Rf is an alkanediyl group; i.e. a $(CF_{2n})$ group) containing from 4 to 17, or from 5 to 12, carbon atoms and wherein the carbon chain may be interrupted once or more than once by an oxygen atom, and wherein Z represents an acid group, in some embodiments, a $—COO^-$ or a $—SO_3^-$ acid group, and M represents a cation selected from alkali metal cations, ammonium ions and $H^+$. The fluoropolymer useful in the composition according to the present disclosure can contain an amount of fluorinated acid or its salt of the above formula of less than 2000 ppb, less than 1000 ppb, or less than 100 ppb (based on the weight of the fluoropolymer). Examples include the perfluorinated alkanoic acids and their salts described below but further include, for example, $CF_3CF_2OCF_2CF_2OCF_2COOH$, $CF_3(CF_2)_6COOH$, $CF_3O(CF_2)_3OCF(CF_3)COOH$, $CF_3O(CF_2)_3OCF_2COOH$, $CF_3(CF_2)_2(OCF(CF_3)CF_2)OCF(CF_3)COOH$, $CF_3(CF_2)_2(OCF_2CF_2)_4OCF(CF_3)COOH$, $CF_3CF_2O(CF_2CF_2O)_3CF_2COOH$, and their salts.

In some embodiments, the fluorinated acid and its salts that can be removed from a fluoropolymer composition with a treatment composition comprising at least one organic liquid can correspond to the general formula:

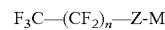

wherein n is an integer from 4 to 17, or from 7 to 12, and wherein Z represents $—COO^-$ or $—SO_3^-$, and M represents a cation selected from alkali metal cations, ammonium ions and $H^+$. The fluoropolymer provided or produced according to the present disclosure can contain an amount of fluorinated acid or its salt of the above formula of less than 1000 ppb or even less than 100 ppb (based on the weight of the fluoropolymer). The fluoropolymer useful in the composition according to the present disclosure can contain an amount of fluorinated acid or its salt of the above formula wherein Z represents $—COO^-$ (carboxylic acid) of less than 2000 ppb, or less than 1000 ppb, or even less than 100 ppb (based on the weight of the fluoropolymer).

In some embodiments, the fluorinated acid and its salts that can be removed from a fluoropolymer composition with a treatment composition comprising at least one organic liquid are perfluorooctanoic acid and its salts. The fluoropolymer useful in the composition of the present disclosure can have an amount of perfluorooctanoic acid or its salts of less than 1200 ppb, less than 600 ppb, less than 50 ppb or less than 25 ppb (based on the weight of the fluoropolymer) or even less than 5 ppb.

In some embodiments, fluorinated acids and their salts that can be removed from a fluoropolymer composition with a treatment composition comprising at least one organic liquid are perfluorooctanoic acid and its salts and perfluorinated C9-C14 alkanoic carboxylic acids and their salts. The fluoropolymer useful in the composition of the present disclosure can have a total amount of perfluorinated $C_9$-$C_{14}$ carboxylic acids (n=7-12 and Z representing a carboxylic acid group in formula $F_3C$—$(CF_2)_n$—Z-M) or their salts of less than 750 ppb, less than 200 ppb, or less than 100 ppb (based on the weight of the fluoropolymer) and an amount of perfluorooctanoic acid or its salts of less than 1200 ppb, less than 600 ppb, less than 50 ppb, less than 25 ppb (based on the weight of the fluoropolymer), or even less than 5 ppb.

In some embodiments, the fluorinated acid or its salt that can be removed from a fluoropolymer composition with a treatment composition comprising at least one organic liquid is a perfluorinated alkanoic sulfonic with 4 to 14 carbon atoms (n=3-13 and Z representing a sulfonic acid group ($SO_3^-$ group) in formula $F_3C$—$(CF_2)_n$—Z-M). The fluoropolymer useful in the composition of the present disclosure can have a total amount of perfluorinated $C_4$-$C_{14}$ sulfonic acids (n=3-13 and Z representing a sulfonic acid group ($SO_3^-$ group) or their salts of less than 750 ppb, less than 200 ppb, or less than 100 ppb (based on the weight of the fluoropolymer).

The alternative fluorinated emulsifier and their salts such as those described above in connection with formula $[R_f$—O-L-COO$^-]_i X_i^+$ can also be removed by using the treatment composition comprising at least one organic liquid and by the same methods described herein as the perfluorinated alkanoic acids and fluoropolymers can be provided that are not only essentially free of one or more perfluorinated alkanoic acid but also essentially free of alternative fluorinated emulsifier acids and their salts. For example, the amount of one or more alternative fluorinated emulsifier acid or its salt may be less than 5000 ppb, preferably less than 2000 ppb and more preferably less than 1000 ppb and most preferably less than 500 ppb (based on the weight of the fluoropolymer).

A treatment composition comprising at least one organic liquid is useful as an alternative method to the anion-exchange method for removing fluorinated acids and their salts. Treatment with the treatment composition described above can provide fluoropolymers that are not only essentially free of fluorinated emulsifier acids and their salts but are also essentially free of non-ionic, non-fluorinated emulsifiers (i.e. contain amounts thereof of less than 2,000 ppb, preferably less than 500 ppb or even less than 50 ppb). The latter are typically used in anion-exchange processes.

In case the curable fluoropolymer obtained upon polymerization contains both carboxylic acid and sulfonic acid emulsifiers, it may be useful to separate the sulfonic acids by anion exchange before subjecting the composition to the treatment composition described herein. A sulfonic acid may be added as an emulsifier during the polymerization, may be present in reaction composition because of impurities in the starting materials, or may be generated as by-products during the polymerization reaction, for example, when sulfonates are used as starting materials. Perfluorinated alkanoic sulfonic acids and their salts include $C_4$-$C_{13}$-perfluorinated alkanoic sulfonic acids and their salts (i.e., perfluoroalkanoic sulfonic acids with 4 to 13 carbon atoms) or $C_4$-$C_8$-perfluorinated alkanoic sulfonic acids and their salts. Such emulsifier acids correspond to formula $F_3C$—$(CF_2)_n$—Z-M with Z representing a sulfonic acid group, $SO_3^-$, and n representing 3 to 12 or 3 to 7, respectively. To remove such a perfluorinated sulfonic acid or its salts the aqueous composition containing the fluoropolymers, typically the reaction product from the polymerization reaction, is subjected to anion exchange. The anion exchange resin used in the anion exchange step can be a basic ion-exchange resin that has been loaded with one or more acids that bond less strongly to the anion exchange resin than the sulfonic emulsifier acid to be removed from the composition. By bonding to the anion exchange resin, the emulsifier sulfonic acid replaces the acid that was absorbed onto the resin and releases it. The anion exchange resin is loaded with one or more fluorinated emulsifier carboxylic acids as described above, in some embodiments, with one or more alternative fluorinated emulsifier carboxylic acids as described above. Releasing the alternative emulsifier carboxylic acid from the resin helps to stabilize the fluoropolymer particles and avoids coagulation of the fluoropolymer particles during the anion exchange process and preferably also thereafter. Anion exchange resins can be used as known in the art for treating fluoropolymer dispersion, for example as described in EP 1 155 055 B1. Addition of non-ionic emulsifiers is not required before, during, or after the anion-exchange step. Although non-fluorinated anionic emulsifiers may be used instead of fluorinated emulsifier carboxylic acids, the use fluorinated emulsifier carboxylic acids may be advantageous because they can be removed in a subsequent process step by subjecting the anion-exchanged composition to the treatment composition including at least one organic solvent. The concentration of the curable fluoropolymer compositions subjected to the anion exchange may typically be from 5 to 40 wt. % or 15 to 30 wt. %. The anion exchange process can typically be run at operation temperatures from about 10° C. to about 50° C. or from 15° C.-35° C. The level of sulfonic acids and their salts can be reduced to below 15 ppb, below 10 ppb, or below 5 ppb (based on the content of fluoropolymer).

The composition obtained from the anion exchange may then be subjected to the treatment composition as described above for removing the fluorinated emulsifiers or alternative fluorinated emulsifiers. The resulting polymers than have very low levels of fluorinated or perfluorinated carboxylic and sulfonic acids and their salts, in particular perfluorinated alkanoic sulfonic and carboxylic acids and their salts having from 4 to 14, more preferably from 4 to 8 carbon atoms, for example with total amounts of such acids and salts of less than 100 ppb or even less than 50 ppb or even less than 20 ppb (based on fluoropolymer).

While —CN cure sites are useful in the compositions according to the present disclosure, other nitrogen-containing cure sites may also be useful. After polymerization, the polymer may be reacted with alcohols to transform the —CN cure sites into C-alkoxycarbonimidoyl cure sites (that is, —C(=NH)—O—$R^5$, wherein R5 is alkyl having from 1 to 10, in some embodiments, 1 to 4, carbon atoms, in which some of the hydrogen atoms may be replaced by fluorine atoms). The reaction can conveniently be carried out by combining the polymer with the alcohol or mixture of alcohols in the presence of a base at ambient temperatures. The corresponding salt(s) of the selected alcohol or amines are useful bases for the reaction. Further details may be found, for example, in U.S. Pat. No. 6,803,425 (Hintzer et al.). Amidines, which may be obtained by reacting the —CN containing polymer with an amine, are also useful cure sites.

The curable fluoropolymers useful in compositions according to the present disclosure may include a blend of fluoropolymers. Two or more different amorphous fluoropolymers each having interpolymerized units derived from a nitrogen-containing cure site monomer may be useful. One or more other amorphous fluoropolymers or copolymers may be blended with the amorphous, curable fluoropolymer having interpolymerized units derived from a nitrogen-containing cure site monomer. Examples of useful other amorphous fluoropolymers for blending include homopolymers and copolymers comprising any of the interpolymerized units mentioned above, but they may lack interpolymerized units derived from a nitrogen-containing cure site monomer and/or may include reactive sites adapted to a selected curative system. The amorphous, curable fluoropolymer having interpolymerized units derived from a nitrogen-containing cure site monomer or the mixture of such amorphous fluoropolymers are typically present in the blend at least at 25 weight percent (wt %), in some embodiments, at least 50 wt %, of the total fluoropolymer in the fluoropolymer composition. In some embodiments, the fluoropolymer in the composition of the present disclosure is comprised entirely of one of more amorphous, curable fluoropolymers with nitrogen-containing interpolymerized units. An amorphous, curable fluoropolymer that has interpolymerized units derived from a nitrogen-containing cure site monomer may have interpolymerized units derived from other types of cure site monomers. For example, an amorphous, curable fluoropolymer according to the present disclosure can contain nitrogen-containing cure site and a halogen that is capable of participation in a peroxide cure reaction.

Peroxide-curable amorphous fluoropolymers typically include a chloro, bromo-, or iodo-cure site. In some embodiments, the amorphous, curable fluoropolymer in the composition according to the present disclosure, which may include one curable fluoropolymer or a blend of fluoropolymers, comprises a bromo- or iodo-cure site. In some of these embodiments, the amorphous fluoropolymer comprises an iodo-cure site. The cure site can be an iodo-, bromo-, or chloro-group chemically bonded at the end of a fluoropolymer chain or may be present along the fluoropolymer chain. The weight percent of elemental iodine, bromine, or chlorine in the amorphous fluoropolymer may range from about 0.2 wt. % to about 2 wt. %, and, in some embodiments, from about 0.3 wt. % to about 1 wt. %. To incorporate a cure site end group into the amorphous fluoropolymer, any one of an iodo-chain transfer agent, a bromo-chain transfer agent or a chloro-chain transfer agent can be used in the polymerization process. For example, suitable iodo-chain transfer agents include perfluoroalkyl or chloroperfluoroalkyl groups having 3 to 12 carbon atoms and one or two iodo-groups. Examples of iodo-perfluorocompounds include 1,3-diiodoperfluoropropane, 1,4-diiodoperfluorobutane, 1,6-diiodoperfluorohexane, 1,8-diiodoperfluorooctane, 1,10-diiodoperfluorodecane, 1,12-diiodoperfluorododecane, 2-iodo-1,2-dichloro-1,1,2-trifluoroethane, 4-iodo-1,2,4-trichloroperfluorobutane and mixtures thereof. Suitable bromo-chain transfer agents include perfluoroalkyl or chloroperfluoroalkyl groups having 3 to 12 carbon atoms and one or two iodo-groups. Chloro-, bromo-, and iodo-cure sites may also be incorporated into the amorphous fluoropolymer by including cure site monomers in the polymerization reaction. Examples of cure site monomers include those of the formula $CX_2$=CX (Z), wherein each X is independently H or F, and Z is I, Br, or $R_f$—Z, wherein Z is I or Br and $R_f$ is a perfluorinated or partially perfluorinated alkylene group optionally containing O atoms. In addition, non-fluorinated bromo- or iodo-substituted olefins, e.g., vinyl iodide and allyl iodide, can be used. In some embodiments, the cure site monomer is $CH_2$=CHI, $CF_2$=CHI, $CF_2$=CFI, $CH_2$=CHCH$_2$I, $CF_2$=CFCF$_2$I, $CH_2$=CHCF$_2$CF$_2$I, $CF_2$=CFCH$_2$CH$_2$I, $CF_2$=CFCF$_2$CF$_2$I, $CH_2$=CH(CF$_2$)$_6$CH$_2$CH$_2$I, $CF_2$=CFOCF$_2$CF$_2$I, $CF_2$=CFOCF$_2$CF$_2$CF$_2$I, $CF_2$=CFOCF$_2$CF$_2$CH$_2$I, $CF_2$=CFCF$_2$OCH$_2$CH$_2$I, $CF_2$=CFO(CF$_2$)$_3$OCF$_2$CF$_2$I, $CH_2$=CHBr, $CF_2$=CHBr, $CF_2$=CFBr, $CH_2$=CHCH$_2$Br, $CF_2$=CFCF$_2$Br, $CH_2$=CHCF$_2$CF$_2$Br, $CF_2$=CFOCF$_2$CF$_2$Br, $CF_2$=CFCl, $CF_2$=CFCF$_2$Cl, or a mixture thereof.

Generally, a total of from about 0.1 to about 5 mol % (in some embodiments from about 0.3 to about 2 mol %) cure site monomeric units, which may have different types of cure sites, is incorporated into the amorphous, curable fluoropolymer or blend of amorphous, curable fluoropolymers.

In embodiments in which the amorphous, curable fluoropolymer contains a chloro, bromo-, or iodo-cure site in addition to a nitrogen-containing cure site as described above, compositions according to the present disclosure typically include a peroxide along with the curative comprising the organo onium cation and anion described in further detail below. Suitable peroxides are generally those which generate free radicals at curing temperatures. Dialkyl peroxides and bis(dialkyl peroxides), each of which decomposes at a temperature above 50° C., may be useful. Examples of useful peroxides include 2,5-dimethyl-2,5-di(t-butylperoxy)hexyne-3,2,5-dimethyl-2,5-di(t-butylperoxy)hexane, dicumyl peroxide, t-butyl perbenzoate, a,a'-bis(t-butylperoxy-diisopropylbenzene), and di[1,3-dimethyl-3-(t-butylperoxy)-butyl]carbonate. Acyl peroxides tend to decompose at lower temperatures than alkyl peroxides and allow for lower temperature curing. Examples of useful acyl peroxides include di(4-t-butylcyclohexyl)peroxydicarbonate, di(2-phenoxyethyl)peroxydicarbonate, di(2,4-dichlorobenzoyl) peroxide, dilauroyl peroxide, decanoyl peroxide, 1,1,3,3-tetramethylethylbutylperoxy-2-ethylhexanoate, 2,5-dimethyl-2,5-di(2-ethylhexanoylperoxy)hexane, disuccinic acid peroxide, t-hexyl peroxy-2-ethylhexanoate, di(4-methylbenzoyl) peroxide, t-butyl peroxy-2-ethylhexanoate, benzoyl peroxide, t-butylperoxy 2-ethylhexyl carbonate, and t-butylperoxy isopropyl carbonate.

Furthermore, in peroxide-cured fluoroelastomers, it is often desirable to include a crosslinker. The crosslinkers may be useful, for example, for providing enhanced mechanical strength in the final cured composition. Examples of useful crosslinkers include tri(methyl)allyl isocyanurate (TMAIC), triallyl isocyanurate (TAIC), tri(methyl)allyl cyanurate, poly-triallyl isocyanurate (poly-TAIC), xylylene-bis(diallyl isocyanurate) (XBD), N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, and $CH_2$=CH—$R_{f1}$—CH=CH$_2$, wherein $R_{f1}$ is a perfluoroalkylene having from 1 to 8 carbon atoms. The crosslinker is typically present in an amount of 1% by weight to 10% by weight versus the weight of the fluoropolymer composition. In some embodiments, the crosslinker is present in a range from 2% by weight to 5% by weight versus the weight of the fluoropolymer composition.

Curing a curable fluoropolymer having nitrogen-containing cure sites can also be modified by using yet other types of curatives in addition to the curative comprising the organo onium cation and anion described in further detail below. Examples of such curatives for amorphous fluoropolymers with nitrile cure sites include bis-aminophenols (e.g., U.S. Pat. No. 5,767,204 (Iwa et al.) and U.S. Pat. No. 5,700,879 (Yamamoto et al.)), bis-amidooximes (e.g., U.S. Pat. No. 5,621,145 (Saito et al.)), and ammonium salts (e.g., U.S. Pat. No. 5,565,512 (Saito et al.)). In addition, ammonia-generating compounds may be useful. "Ammonia-generating compounds" include compounds that are solid or liquid at ambient conditions but that generate ammonia under conditions of cure. Examples of such compounds include hexamethylenetetramine (urotropin), dicyandiamide, and substituted and unsubstituted triazine derivatives such as those of the formula:

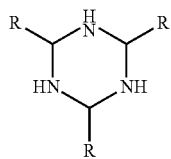

wherein R is a hydrogen atom or a substituted or unsubstituted alkyl, aryl, or aralkyl group having from 1 to about 20 carbon atoms. Specific useful triazine derivatives include hexahydro-1,3,5-s-triazine and acetaldehyde ammonia trimer.

The combination of curative(s) is generally from about 0.01 to about 10 mol % (in some embodiments, from about 0.1 to about 5 mol %) of the total fluoropolymer amount.

Fluoropolymer fillers may also be present in the compositions of the present disclosure. A partially crystalline fluorothermoplastic can be used as the filler. Generally, from 1 to 100 phr of fluoropolymer filler per hundred parts curable fluoropolymer is used. The fluoropolymer filler can be finely divided and easily dispersed as a solid at the highest temperature used in fabrication and curing of the composition of the present disclosure. By solid, it is meant that the filler material, if at least partially crystalline, will have a crystalline melting temperature above the processing temperature(s) of the fluoropolymer composition(s). One way to incorporate fluoropolymer filler is by blending latices. This procedure, using various kinds of fluoropolymer filler, is described in U.S. Pat. No. 6,720,360 (Grootaert et al.).

Fluorothermoplastics useful as a filler in the composition of the present disclosure are polymers with melting points typically from 100° C. to 340° C. The fluorothermoplastics can be used in the form of their dispersions. Such dispersions can contain low molecular weight PTFE, the so-called micropowders or waxes (as described in DE-C-22 35 885) optionally modified with HFP, and/or fluorinated ethers, including any of those described above. The dispersions can comprise melt-processable copolymers of TFE and perfluorinated ethers, known as "PFA", melt processable copolymers of TFE and HFP, known as "FEP", and partially crystalline polymers of TFE and ethylene (ET), known as "ETFE", or TFE, HFP and vinylidene fluoride, known as "THV".

In some embodiments, the composition of the present disclosure the curable fluoropolymer described above in any of its embodiments and one or more PTFE polymers or copolymers. In some embodiments, the composition of the present disclosure comprises one or more curable fluoropolymers described above in any of their embodiments and one or more tetrafluoroethene copolymers having a melting point of from about 250° C. to about 326° C., a melt flow index (MFI at 372° C. and 5 kg load) of 0.1-50 grams/10 minutes. In some embodiments, the tetrafluoroethene copolymer has at least 89% by weight of units derived from tetrafluoroethene and from about 0.5 to about 6% by weight of units derived from at least one perfluorinated alkyl vinyl or allyl ether comonomer. In some embodiments, the tetrafluoroethene copolymer has from 0 to 4% by weight of units derived from one or more copolymerizable optional comonomers. The total weight of the polymer is 100% by weight.

The at least one perfluorinated alkyl ether can be a perfluorinated alkyl allyl ether represented by formula $CF_2=CF-CF_2-O-Rf$, wherein Rf is a perfluorinated alkyl group having from 1 to 10 carbon atoms. Examples of suitable Rf groups include perfluoromethyl ($CF_3$), perfluoroethyl ($C_2F_5$), perfluoropropyl ($C_3F_7$), and perfluorobutyl ($C_4F_9$). Such thermoplastic high melting fluoropolymers are believed to also have a low amount of extractable fluorinated emulsifier acids. The copolymer can have a melting point from 286° C. to 326° C. and a melt flow index (MFI at 372° C. and 5 kg load) of 31 to 50 grams/10 minutes. In some embodiments, the partially crystalline fluoropolymer can have from 0.5 to 4.0% by weight of units derived from the at least one perfluorinated alkyl allyl ether represented by formula $CF_2=CF-CF_2-O-Rf$, wherein Rf is perfluoromethyl. In some embodiments, the partially crystalline fluoropolymer can have from 0.5 to 5.0% by weight of units derived from the at least one perfluorinated alkyl allyl ether represented by formula $CF_2=CF-CF_2-O-Rf$, wherein Rf is perfluoroethyl. In some embodiments, the partially crystalline fluoropolymer can have from 0.5 to 6.0% by weight of units derived from the at least one perfluorinated alkyl allyl ether represented by formula $CF_2=CF-CF_2-O-Rf$, wherein Rf is perfluoropropyl or perfluorobutyl. In some embodiments, the partially crystalline fluoropolymer can have from 1.0 to 6.0% by weight of units derived from the at least one perfluorinated alkyl allyl ether represented by formula $CF_2=CF-CF_2-O-Rf$, wherein Rf has from 5 to 10 carbon atoms.

In some embodiments, the tetrafluoroethene copolymer has from 94 to 99% by weight units derived from tetrafluoroethene and from 1 to 5% by weight of units derived from the at least one PAAE and from up to 6% by weight, preferably up to 4.4% by weight of units derived from one or more copolymerizable optional comonomer selected from hexafluoropropene (HFP).

The blends may typically contain the amorphous, curable fluoropolymer in an amount of from about 10% up to about 90% by weight based on the total weight of the blend which is 100% by weight. The blend may contain the fluorothermoplastic polymers in an amount from about 10% by weight up to 90% by weight based on the total weight of the blend which 100% by weight. In some embodiments, the blends are solid particles.

In some embodiments, the blend is an aqueous dispersion. Such dispersion may contain from about 10 to 80% by weight of water and from 10% to 90% by weight of amorphous, curable fluoropolymers and from 10 to 90% by weight of fluorothermoplastic polymer and wherein the amounts are selected such that the total weight of the blend is 100% by weight.

The blends may be prepared in various ways. In some embodiments, an aqueous dispersion of amorphous, curable fluoropolymer particles is blended with an aqueous dispersion of thermoplastic fluoropolymer. The resulting dispersion may be coagulated, for example, by addition of one or more mineral acid as described herein, and subjected to the treatment composition comprising at least one organic liquid described herein. Another example includes preparing the amorphous, curable fluoropolymer as described above and combining the coagulated fluoropolymer particles with an aqueous dispersion of thermoplastic fluoropolymer. A further example includes dry blending coagulated amorphous, curable fluoropolymer particles with particles of thermoplastic fluoropolymer.

In some embodiments, the amorphous, curable fluoropolymer and thermoplastic fluoropolymer have a particle size of from about 50 nm to 300 nm, or from 80 nm to 250 nm. The average particle size of the amorphous, curable fluoropolymer may be smaller, greater or the same as the average particle size of the thermoplastic fluoropolymer.

In some embodiments, the blend of the amorphous, curable fluoropolymer and the fluorothermoplastic has a total extractable amount of perfluorinated $C_6$-$C_{12}$ alkanoic carboxylic acids or its salts of less than 500 ppb based on the amount of the copolymer. In some embodiments, the blends have a total amount of perfluorooctanoic acid or its salts of less than 50 ppb or less than 25 ppb.

To further enhance the bonding between the amorphous, curable fluoropolymer matrix and the thermoplastic filler, the thermoplastics can be modified with Br-, I- and/or CN-containing comonomers. The cure site monomers described herein can be used for this purpose. These modifiers are typically added near the end of the polymerization reaction, for example during the last 5% to 10% of the polymerization process; the overall modifier content is typically less than 1% by weight based on the weight the thermoplastic fluoropolymer. In a crosslinking reaction of the matrix, the thermoplastic material can be bonded to the amorphous, curable fluoropolymer.

Additives such as carbon black, stabilizers, plasticizers, lubricants, fillers, and processing aids typically utilized in fluoropolymer compounding can be incorporated into the curative compositions and fluoropolymer compositions according to the present disclosure, provided they have adequate stability for the intended service conditions. In particular, low temperature performance can be enhanced by incorporation of perfluoropolyethers as described for example, U.S. Pat. No. 5,268,405 (Ojakaar et al.) Carbon black fillers can be employed in fluoropolymers as a means to balance modulus, tensile strength, elongation, hardness, compression set, abrasion resistance, conductivity, and processability of the compositions. Suitable examples of carbon black fillers include MT blacks (medium thermal black designated N-991, N-990, N-908, and N-907; FEF N-550) and large particle size furnace blacks. When used, 1 to 100 parts filler per hundred parts fluoropolymer (phr) is generally sufficient.

Alternatively, in some embodiments, including any of the embodiments of the composition disclosed herein, the composition according to the present disclosure is free of fillers (e.g., inorganic fillers) or contains less than 5%, 2%, or 1% by weight fillers (e.g., inorganic fillers) versus the weight of the composition. In addition to advantages described above for avoiding silicon dioxide, another advantage to avoiding fillers in the curable compositions disclosed herein is that visible light transmissive cured fluoroelastomers may be obtained.

The curative useful in the composition according to the present disclosure includes an organo onium cation and an anion represented by Formula I or Formula II

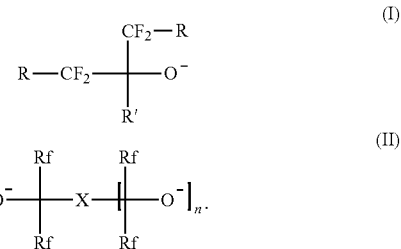

In Formula I, each R and R' is independently hydrogen, halogen (i.e., —F, —Cl, —Br, or —I), alkyl, aryl, arylalkylenyl, or alkylarylenyl, wherein the alkyl, aryl, arylalkylenyl, or alkylarylenyl each may be unsubstituted or each may be substituted by one or more halogens, with the proviso that R' is not halogen. In some embodiments, any two of the R and R' groups can join together to form a ring. For example, any two of the R and R' groups can join together to form a divalent alkylene (e.g., ethylene, propylene, or butylene), arylene, alkylarylene, or arylalkylene group wherein a portion of the carbon atoms may be substituted by heteroatoms selected from N, O and S.

In some embodiments, each R is independently hydrogen, halogen (i.e., —F, —Cl, —Br, or —I), alkyl having up to 12 carbon atoms (e.g., methyl, ethyl, hexyl, isooctyl, isopropyl, cyclohexyl, norbornyl, and [2.2.2]bicyclooctyl), $C_6$-$C_{14}$ aryl (e.g., phenyl, naphthyl, biphenylyl, pyridinyl, pyrazinyl, and phenanthryl), $C_7$-$C_{18}$ alkylarylenyl (e.g., toluyl, isodecylphenyl, and isopropylphenyl), $C_7$-$C_{18}$ arylalkylenyl (e.g., phenylmethyl, phenethyl, and phenylpropyl), $C_2$-$C_{12}$ alkoxyalkyl (e.g., methoxymethyl, methoxypropyl) and alkoxyalkoxylalkyl (e.g., methoxymethoxymethyl, ethoxyethoxyethyl, and methoxyethoxyethyl), and partially or perfluorinated derivatives of any of the foregoing. In some embodiments, each R is —F.

In some embodiments, R' is independently alkyl having up to 12 carbon atoms (e.g., methyl, ethyl, hexyl, isooctyl, isopropyl, cyclohexyl, norbornyl, and [2.2.2]bicyclooctyl), $C_6$-$C_{14}$ aryl (e.g., phenyl, naphthyl, biphenylyl, pyridinyl, pyrazinyl, and phenanthryl), $C_7$-$C_{18}$ alkylarylenyl (e.g., toluyl, isodecylphenyl, and isopropylphenyl), $C_7$-$C_{18}$ arylalkylenyl (e.g., phenylmethyl, phenethyl, and phenylpropyl), $C_2$-$C_{12}$ alkoxyalkyl (e.g., methoxymethyl, methoxypropyl) and alkoxyalkoxylalkyl (e.g., methoxymethoxymethyl, ethoxyethoxyethyl, and methoxyethoxyethyl), and partially or perfluorinated derivatives of any of the foregoing. In some embodiments, R' is independently perfluoroalkyl having up to 12, 11, 10, 9, 8, 7, 6, 5, 4, 3, or 2 carbon atoms. In some embodiments, R' is other than perfluoroalkyl having up to 12, 11, 10, 9, 8, 7, 6, 5, 4, 3, or 2 carbon atoms. In some embodiments, R' is hydrogen, phenyl, methoxyphenyl, toluyl, fluorophenyl, or trifluoromethylphenyl. In some embodiments, R' is not trifluoromethyl. In some embodiments, R' is toluyl.

In Formula II, each Rf is RCF$_2$— or a perfluoroalkyl group having up to 8 carbon atoms, X is an organic linking group that is nonfluorinated or at least partially fluorinated, and n is 1 or 2. R is hydrogen, halogen (i.e., —F, —Cl, —Br, or —I), alkyl, aryl, arylalkylenyl, or alkylarylenyl, wherein the alkyl, aryl, arylalkylenyl, or alkylarylenyl each may be unsubstituted or each may be substituted by one or more halogens. In some embodiments, R is independently hydrogen, halogen (i.e., —F, —Cl, —Br, or —I), alkyl having up to 12 carbon atoms (e.g., methyl, ethyl, hexyl, isooctyl, isopropyl, cyclohexyl, norbornyl, and [2.2.2]bicyclooctyl), $C_6$-$C_{14}$ aryl (e.g., phenyl, naphthyl, biphenylyl, pyridinyl, pyrazinyl, and phenanthryl), $C_7$-$C_{18}$ alkylarylenyl (e.g., toluyl, isodecylphenyl, and isopropylphenyl), $C_7$-$C_{18}$ arylalkylenyl (e.g., phenylmethyl, phenethyl, and phenylpropyl), $C_2$-$C_{12}$ alkoxyalkyl (e.g., methoxymethyl, methoxypropyl) and alkoxyalkoxylalkyl (e.g., methoxymethoxymethyl, ethoxyethoxyethyl, and methoxyethoxyethyl), and partially or perfluorinated derivatives of any of the foregoing. In some embodiments, each Rf is trifluoromethyl. The linking group X can be aryl, lower alkylene (e.g., $C_1$-$C_{10}$), and may contain a heteroatom. The linking group may be substituted with halo or lower alkyl (having from 1 to about 10 carbon atoms). In some embodiments, X is phenylene.

Organo onium cations that useful in the curative include sulfonium, phosphonium, and ammonium cations. The organo onium cation can be a trihydrocarbylsulfonium, a tetrahydrocarbylphosphonium or a tetrahydrocarbylammonium cation. Useful hydrocarbyl groups include alkyl, aryl, arylalkylenyl, and alkylarylenyl groups, each of which may be unsubstituted or substituted by at least one of halogen, alkoxy, (di)alkylamino, hydroxyl groups. The organo onium cation can be a trialkylsulfonium, a tetraalkylphosphonium or a tetraalkylammonium cation. In the trialkylsulfonium, tetralkylphosphonium, or tetraalkylammonium cation, each alkyl independently has up to 12 carbon atoms. In some embodiments, each alkyl independently has up to 11, 10, 9, 8, 7, 6, 5, 4, 3, or 2 carbon atoms. Examples of useful organoonium cations include tributylbenzylammonium, tetrabutylammonium, dibutyldiphenylammonium, triphenylbenzylphosphonium, tetrabutylphosphonium, and tributylallylphosphonium, tributyl-2-methoxypropylphosphonium, triphenylsulfonium, tritolylsulfonium, benzyl tris(dimethylamino)phosphonium, and benzyl(diethylamino)diphenylphosphonium. In some embodiments, the cation is a tetramethylammonium or a tetrabutylphosphonium. In some embodiments, the cation is tetrabutylphosphonium.

In some embodiments, the curative useful in the composition of the present disclosure is other than tetramethylammonium perfluoro-tert-butoxide and tetrabutylphosphonium perfluoro-tert-butoxide. In some embodiments, the curative useful in the composition of the present disclosure includes tetrabutylphosphonium 2-p-toluyl-1,1,1,3,3,3-hexafluoroisopropanoate.

The curative composition according to the present disclosure can be prepared, for example, by reacting an alcohol represented by Formula $(RCF_2)_2C(R')$—OH or HO—$C(Rf)_2$—X—$[C(Rf)_2$—OH$]_n$ with a base, such as a tetraalkylphosphonium or tetraalkylammonium hydroxide in a suitable solvent optionally containing water. The alcohol represented by Formula $(RCF_2)_2C(R')$—OH or HO—$C(Rf)_2$—X—$[C(Rf)_2$—OH$]_n$ may alternatively be reacted with a metal hydroxide or alkoxide, such as sodium methoxide, and adding a tetraalkylphosphonium or tetraalkylammonium halide, such as a tetraalkylphosphonium or tetraalkylammonium chloride or bromide, in a solvent and optionally precipitating the resulting halide salt. In the alcohol represented by Formula $(RCF_2)_2C(R')$—OH or HO—$C(Rf)_2$—X—$[C(Rf)_2$—OH$]_n$, R, R', Rf, X, and n are as defined in any of the embodiments described above. Some alcohols represented by Formula $(RCF_2)_2C(R')$—OH or HO—$C(Rf)_2$—X—$[C(Rf)_2$—OH$]_n$ are commercially available. Others can be made by known methods, for example, by reacting a perfluorinated ketone (e.g., hexafluoroacetone) with a suitable nucleophilic reagent.

In methods of preparing the curative, the solvent used in the reaction medium may be essentially free of hydrocarbon alcohols. The term "essentially free" as used herein means less than 5 wt % of hydrocarbon alcohol based on the total weight of the curative, in some embodiments, less than 1 wt % of hydrocarbon alcohol based on the total weight of the curative, and in some embodiments, less than 0.1 wt % of hydrocarbon alcohol based on the total weight of the curative. The term "hydrocarbon alcohol" as used herein refers to an alcohol that has only hydrogen or carbon substituents on the hydroxyl bearing carbon. Examples include ethanol, methanol, propanols, ethylene glycol, and 2-methoxy ethanol. The solvent may also be essentially free of alcohols including halogen atoms at least 2 carbon atoms away from the hydroxyl bearing carbon. As suggested in Int. Pat. Appl. Pub. No. WO 2010/151610 (Grootaert et al.), preparing the curative in a reaction medium that is essentially free of hydrocarbon alcohols may be useful for eliminating premature curing during processing, often referred to as "scorch". A curative n essentially free of hydrocarbon alcohol may be obtained by vacuum stripping a hydrocarbon alcohol from the curative if the hydrocarbon alcohol is present during the preparation of the curative.

The curative useful in the composition of the present disclosure may also be prepared in situ, such as by reacting one or more alcohols represented by Formula $(RCF_2)_2C(R')$—OH or HO—$C(Rf)_2$—X—$[C(Rf)_2$—OH$]_n$ and a tetraalkylphosphonium or tetraalkylammonium chloride or bromide, for example, with a suitable base in a composition without isolating the salt. Accordingly, in some embodiments, the curative composition disclosed herein may further comprise an organic or inorganic base. However, suitable bases often include $Ca(OH)_2$, MgO, and combinations thereof, and it is desirable to avoid these bases in the composition of the present disclosure. Further, the precursors to the curative composition may be provided into a fluoropolymer composition, such that the curative composition forms in situ and/or such that the effective components of the curative arise during typical fluoropolymer operations such as milling a fluoroelastomer. More particularly, the precursor materials leading to the curative composition can be combined by adding the cation component(s) and/or the alcohol represented by Formula $(RCF_2)_2C(R')$—OH or HO—$C(Rf)_2$—X—$[C(Rf)_2$—OH$]_n$ separately into the fluoropolymer composition.

Any effective amount of the curative useful for practicing the present disclosure may be used to crosslink the curable fluoropolymer in the composition of the present disclosure. The amount of the curative may be selected such that the curable fluoropolymer crosslinks to a sufficient extent to develop the desired physical properties and/or at a desirable rate for a particular process. Various components in a composition may also affect the amount of curative composition desired. For example, the type and/or amount of filler selected may retard or accelerate curing relative to a similar, but unfilled, composition, requiring an appropriate adjustment in the amount of curative. The composition of the amorphous, curable fluoropolymer also affects the effective amount of the curative. For example, when a blend of an amorphous, curable fluoropolymer with interpolymerized units of a nitrogen-containing cure site monomer and another amorphous fluoropolymer having halogen cure sites is used, an effective amount of the curative can be used to crosslink the curable fluoropolymer having interpolymerized units derived from a nitrogen-containing cure site monomer together with an effective amount of a second curative used to crosslink the other fluoropolymer. Also, when an amorphous, curable fluoropolymer includes both nitrogen-containing cure sites and other cure sites, a combination of the curative and the second curative may be useful. Generally, an effective amount of the curative in combination with any second curative is at least about 0.1 parts curative per hundred parts of fluoropolymer on a weight basis (phr), in some embodiments at least about 0.5 phr. The effective amount of curative generally is below about 10 phr, in some embodiments, below about 5 phr.

Compositions according to the present disclosure can be prepared by mixing the curable fluoropolymer, which may include more than one fluoropolymer as described above, the curative comprising an organo onium cation and an anion represented by Formula

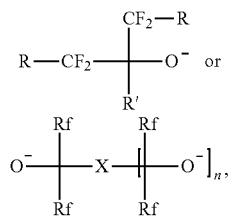

any desired additional curatives, additives, crosslinkers, or adjuvants as described above. Typically, and advantageously, the curative does not include a silicon dioxide carrier. The components can be compounded on conventional rubber processing equipment, for example. Compounding can be carried out, for example, on a roll mill (e.g., two-roll mill), internal mixer (e.g., mixers having the trade designation "BANBURY" from Farrel Corp.), or another rubber-mixing device. Thorough mixing is typically desirable to distribute the components and additives uniformly throughout the composition so that it can cure effectively. The compounding can be carried out in one or several steps. It is typically desirable that the temperature of the composition during mixing should not rise high enough to initiate curing. For example, the temperature of the composition may be kept at or below about 120° C., 100° C., or 80° C.

The mixture is then processed and shaped, such as by extrusion (e.g., into the shape of a film, tube, or hose) or by molding (e.g., in the form of sheet or an O-ring). The shaped article can then be heated to cure the fluoropolymer composition and form a cured article.

Molding or press curing of the compounded mixture usually is conducted at a temperature sufficient to cure the mixture in a desired time duration under a suitable pressure. Generally, this is between about 95° C. and about 350° C., in some embodiments, between about 150° C. and about 300° C., for a period of from about 1 minute to 15 hours, typically from 5 minutes to 30 minutes. The temperature refers to the temperature to which the environment (e.g., oven) for curing is set. A pressure of between about 700 kPa and about 21,000 kPa is usually imposed on the compounded mixture in a mold. The molds may be first coated with a release agent and baked. The cure time may depend on the composition of the curable fluoropolymer and the cross-sectional thickness of the cured fluoroelastomer.

The molded mixture or press-cured article is then usually post-cured (e.g., in an oven) at a temperature and for a time sufficient to complete the curing, usually between about 150° C. and about 350° C., typically at about 230° C., for a period of from about 2 hours to 50 hours or more, generally increasing with the cross-sectional thickness of the article. For thick sections, the temperature during the post cure is usually raised gradually from the lower limit of the range to the desired maximum temperature. The maximum temperature used is typically about 350, 325, or 300° C., and this temperature is held for about 4 hours or more. The post-cure step generally completes the cross-linking and may also release residual volatiles from the cured compositions. One example of a suitable post-cure cycle involves exposing molded parts to heat under nitrogen using six stages of conditions. First, the temperature is increased from 25° C. to 200° C. over 6 hours, then the parts are held at 200° C. for 16 hours, after which the temperature is increased from 200° C. to 250° C. over 2 hours. Then the parts are held at 250° C. for 8 hours, after which the temperature is increased from 250° C. to 300° C. over 2 hours. Then the parts are held at 300° C. for 16 hours. In some embodiments, crosslinking of the composition is carried out in an oven set to above 300° C., for example, 325° C. or higher, for more than one, two, five, or about 10 hours. This may be in an initial curing step, a post-curing step, or both. In some embodiments, curing at a temperature higher 300° C. can help to prevent splitting of molded parts. Finally, the parts are returned to ambient temperature such as by shutting off the oven heat.

The composition according to the present disclosure can be used to make cured fluoroelastomers in the form of a variety of articles, including final articles, such as O-rings, gaskets, tubing, and seals, and/or preforms from which a final shape is made, (e.g. a tube from which a ring is cut). To form an article, the fluoropolymer composition can be extruded using a screw type extruder or a piston extruder. The extruded or pre-formed curable compositions can be cured in an oven at ambient pressure or under elevated pressure. A post-cure cycle may then be useful. The compositions of the present disclosure well-suited for applications such as seals and gaskets for manufacturing semiconductor devices, and in seals for high temperature automotive uses.

Alternatively, the fluoropolymer composition can be shaped into an article using injection molding, transfer molding, or compression molding. Injection molding of the composition, for example, can be carried out by masticating the composition in an extruder screw, collecting it in a heated chamber from which it is injected into a hollow mold cavity by means of a hydraulic piston. After vulcanization the article can then be demolded. Advantages of injection molding process include short molding cycles, little or no preform preparation, little or no flash to remove, and low scrap rate.

The composition according to the present disclosure can also be used to prepare cure-in-place gaskets (CIPG) or form-in-place gaskets (FIPG). A bead or thread of the fluoropolymer composition can be deposited from a nozzle onto a substrates surface. After forming to a desired gasket pattern, the composition may be cured in place with a heat or in an oven at ambient pressure.

Some Embodiments of the Disclosure

In a first embodiment, the present disclosure provides a composition comprising:

a curable fluoropolymer comprising nitrogen-containing cure sites; and
a curative comprising an organo onium cation and an anion represented by Formula

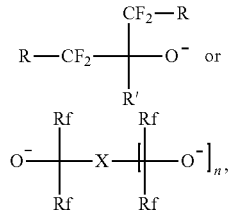

wherein
each R and R' is independently hydrogen, halogen, alkyl, aryl, arylalkylenyl, or alkylarylenyl, wherein the alkyl, aryl, arylalkylenyl, or alkylarylenyl each may be unsubstituted or each may be substituted by one or more halogens, with the proviso that R' is not halogen, or R and R' can join together to form a ring;
each Rf is $RCF_2$— or a perfluoroalkyl group having up to 8 carbon atoms;
X is an organic linking group that is nonfluorinated or at least partially fluorinated; and
n is 1 or 2;
wherein the composition is free of metal cations or comprises not more than 20 parts per million metal cations, and wherein the composition is free of silicon dioxide or comprises less than 0.5 percent by weight silicon dioxide, based on the total weight of the composition.

In a second embodiment, the present disclosure provides the composition of the first embodiment, wherein the composition comprises not more than 2 ppm of a fluorinated acid or salt thereof having 4 to 18 carbon atoms.

In a third embodiment, the present disclosure provides the composition of the first or second embodiment, wherein the curative composition is essentially free of hydrocarbon alcohol.

In a fourth embodiment, the present disclosure provides the composition of any one of the first to third embodiments, wherein the composition is free of metal cations or comprises not more than 10 parts per million metal cations.

In a fifth embodiment, the present disclosure provides the composition of any one of the first to fourth embodiments, wherein the composition is free of silicon dioxide or comprises less than 0.05 percent by weight silicon dioxide, based on the total weight of the composition.

In a sixth embodiment, the present disclosure provides the composition of any one of the first to fifth embodiments, wherein the curable fluoropolymer is an amorphous, curable fluoropolymer.

In a seventh embodiment, the present disclosure provides the composition of the sixth embodiment, further comprising a partially crystalline fluoropolymer.

In an eighth embodiment, the present disclosure provides the composition of any one of the first to seventh embodiments, further comprising at least one of an ammonia-generating compound, a substituted triazine derivative, an unsubstituted triazine derivative, a peroxide, a bis-aminophenol, a bis-amidooxime, an organotin compound, or an amidine, bis-amidine, tris-amidine, tetra-amidine, or a salt thereof.

In a ninth embodiment, the present disclosure provides a composition consisting of:

a curable fluoropolymer comprising nitrogen-containing cure sites; and
a curative comprising an organo onium cation and an anion represented by Formula

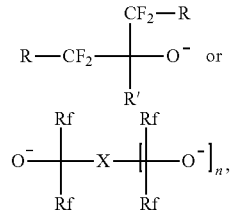

wherein
each R and R' is independently hydrogen, halogen, alkyl, aryl, arylalkylenyl, or alkylarylenyl, wherein the alkyl, aryl, arylalkylenyl, or alkylarylenyl each may be unsubstituted or each may be substituted by one or more halogens, with the proviso that R' is not halogen, or R and R' can join together to form a ring;
each Rf is $RCF_2$— or a perfluoroalkyl group having up to 8 carbon atoms;
X is an organic linking group that is nonfluorinated or at least partially fluorinated; and
n is 1 or 2.

In a tenth embodiment, the present disclosure provides the composition of the ninth embodiment, wherein the curable fluoropolymer is an amorphous, curable fluoropolymer.

In an eleventh embodiment, the present disclosure provides a composition consisting of:
an amorphous, curable fluoropolymer comprising nitrogen-containing cure sites;
a partially crystalline fluoropolymer; and
a curative comprising an organo onium cation and an anion represented by Formula

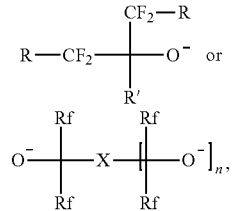

wherein
each R and R' is independently hydrogen, halogen, alkyl, aryl, arylalkylenyl, or alkylarylenyl, wherein the alkyl, aryl, arylalkylenyl, or alkylarylenyl each may be unsubstituted or each may be substituted by one or more halogens, with the proviso that R' is not halogen, or R and R' can join together to form a ring;
each Rf is $RCF_2$— or a perfluoroalkyl group having up to 8 carbon atoms;
X is an organic linking group that is nonfluorinated or at least partially fluorinated; and
n is 1 or 2.

In a twelfth embodiment, the present disclosure provides the composition of any one of the first to eleventh embodiments, wherein each R is F or perfluoroalkyl having up to 3 carbon atoms, and wherein R' is hydrogen, phenyl, methoxyphenyl, toluyl, fluorophenyl, trifluoromethylphenyl, or trifluoromethyl.

In a thirteenth embodiment, the present disclosure provides the composition of any one of the first to twelfth embodiments, wherein R' is other than perfluoroalkyl having up to 12 carbon atoms (e.g., trifluoromethyl).

In a fourteenth embodiment, the present disclosure provides the composition of any one of the first to thirteenth embodiments, wherein the organo onium cation is a tetraalkylphosphonium cation or a tetraalkylammonium cation.

In a fifteenth embodiment, the present disclosure provides the composition of any one of the first to fourteenth embodiments, wherein the curative is tetrabutylphosphonium 2-p-toluyl-1,1,1,3,3,3-hexafluoroisopropanoate.

In a sixteenth embodiment, the present disclosure provides the composition any one of the first to fifteenth embodiments, wherein the curative is not tetramethylammonium perfluoro-tert-butoxide and not tetrabutylphosphonium perfluoro-tert-butoxide.

In a seventeenth embodiment, the present disclosure provides the composition any one of the first to sixteenth embodiments, wherein the nitrogen-containing cure sites are nitrile-containing cure sites.

In an eighteenth embodiment, the present disclosure provides the composition of any one of the first to seventeenth embodiments, wherein the curable fluoropolymer comprises interpolymerized units of tetrafluoroethylene and at least one of a different perfluorinated olefin, a partially fluorinated olefin, a non-fluorinated olefin, a perfluoroalkylallylether, a perfluoroalkoxyalkylallylether, a perfluoroalkylvinylether, or a perfluoroalkoxyalkylvinylether.

In a nineteenth embodiment, the present disclosure provides the composition of the eighteenth embodiment, wherein the interpolymerized units further comprise at least one of perfluoro(8-cyano-5-methyl-3,6-dioxa-1-octene), $CF_2=CFO(CF_2)_LCN$, $CF_2=CFO(CF_2)_uOCF(CF_3)CN$, $CF_2=CFO[CF_2CF(CF_3)O]_q(CF_2O)_yCF(CF_3)CN$, or $CF_2=CF[OCF_2CF(CF_3)]_rO(CF_2)_tCN$, wherein L is in a range from 2 to 12; u is in a range from 2 to 6; q is in a range from 0 to 4; y is in a range from 0 to 6; r is in a range from 1 to 2; and t is in a range from 1 to 4.

In a twentieth embodiment, the present disclosure provides a shaped article comprising the composition of any one of the first to nineteenth embodiments.

In a twenty-first embodiment, the present disclosure provides a fluoroelastomer prepared by curing the composition of any one of the first to nineteenth embodiments.

In a twenty-second embodiment, the present disclosure provides a method of making a fluoroelastomer article, the method comprising:
 providing the composition of any one of the first to nineteenth embodiments;
 shaping the fluoropolymer composition; and
 crosslinking the composition to form the fluoroelastomer article.

In a twenty-third embodiment, the present disclosure provides the method of the twenty-second embodiment, wherein crosslinking comprises heating the composition in an environment with a temperature set higher than 300° C.

In a twenty-fourth embodiment, the present disclosure provides a process for making the composition of any one of the first to nineteenth embodiments, the process comprising:
 providing an aqueous composition containing particles of the curable fluoropolymer;
 coagulating the curable fluoropolymer by at least one of contacting the aqueous composition with a mineral acid or freeze coagulation;
 isolating the curable fluoropolymer; and
 combining the curable fluoropolymer with the curative.

In a twenty-fifth embodiment, the present disclosure provides the process of the twenty-fourth embodiment, wherein coagulating comprises contacting the aqueous composition with a mineral acid.

In a twenty-sixth embodiment, the present disclosure provides the process of the twenty-fifth embodiment, further comprising:
 contacting the aqueous composition with a treatment composition comprising an organic solvent at least one of simultaneously with or subsequent to contacting the aqueous composition with a mineral acid.

In a twenty-seventh embodiment, the present disclosure provides the process of any one of the twenty-fourth to twenty-sixth embodiments, wherein the curative does not include a silicon dioxide carrier.

In a twenty-eighth embodiment, the present disclosure provides the process of any one of the twenty-fourth to twenty-seventh embodiments, further comprising combining the aqueous composition comprising particles of the curable fluoropolymer with an aqueous composition comprising particles of a partially crystalline fluoropolymer before contacting the aqueous composition with the mineral acid.

In order that this disclosure can be more fully understood, the following examples are set forth. It should be understood that these examples are for illustrative purposes only and are not to be construed as limiting this disclosure in any manner.

EXAMPLES

All materials are commercially available, for example from Sigma-Aldrich Chemical Company, Milwaukee, WI, USA, or known to those skilled in the art, unless otherwise stated or apparent.

The following abbreviations are used in this section: kg=kilograms, cm=centimeters, wt %=percent by weight, min=min, h=hours, dNm=decinewton meters, ppm=parts per million, mol=moles, ° C.=degrees Celsius, MFI=melt flow index, ICP-MS=inductively coupled plasma mass spectrometry. Abbreviations for materials used in this section, as well as descriptions of the materials, are provided in Table 1.

TABLE 1

Materials

| Material | Details |
|---|---|
| TFE | Tetrafluoroethylene |
| PMVE | Perfluoromethyl vinyl ether |
| MV5CN | $CF_2=CFO(CF_2)_5CN$ |
| PPVE | Perfluoropropyl vinyl ether |
| PPAE | Perfluoropropyl allyl ether ($CF_2=CFCF_2OC_3F_7$) |
| PFE A | Copolymer of 65.7 mol % TFE, 33.0 mol % PMVE, and 1.3 mol % |

TABLE 1-continued

Materials

| Material | Details |
|---|---|
| | MV5CN, made via aqueous emulsion polymerization and coagulated with an aqueous 1.3 wt % MgCl$_2$ solution, washed with deionized water and oven dried at 115° C. for 16 h |
| PFE B | Latex blend of an elastomer copolymer of 65.7 mol % TFE, 33.0 mol % PMVE, and 1.3 mol % MV5CN and a thermoplastic copolymer of 98.5 mol % TFE and 1.5 mol % PPVE (having a melting point of 308° C.), blended to achieve a 80/20 ratio by weight of elastomer to thermoplastic, coagulated with an aqueous 1.3 wt % MgCl$_2$ solution, washed with deionized water and oven dried at 115° C. for 16 h |
| PFE C | Copolymer of 65.1 mol % TFE, 33.0 mol % PMVE, and 1.9 mol % MV5CN, made via aqueous emulsion polymerization and coagulated with an aqueous 1.3 wt % MgCl$_2$ solution, washed with deionized water and oven dried at 115° C. for 16 h |
| PFE D | Copolymer prepared as described for PFE A, with the exception that, prior to coagulation, the latex was passed through an ion exchange column loaded with a strong base type ion exchange resin available under the trade designation AMBERJET 4200 from Dow Chemical Company, Midland, MI, USA, and then the latex was coagulated using a 5 wt % aqueous solution of HNO$_3$ |
| PFE E | Latex blend of an elastomer copolymer of 65.7 mol % TFE, 33.0 mol % PMVE, and 1.3 mol % MV5CN, made via aqueous emulsion polymerization and passed through an ion exchange column loaded with a strong base type ion exchange resin available under the trade designation AMBERJET 4200 from Dow Chemical Company, and a thermoplastic copolymer of 99.1 mol % TFE, 0.6 mol % PMVE, and 0.3 mol % PPAE (having a melting point of 308° C. and an MFI of 1 (372° C./5 kg)), blended to achieve a 80/20 ratio by weight of elastomer to thermoplastic, coagulated using a 5 wt % aqueous solution of HNO$_3$, washed with deionized water and oven dried at 115° C. for 16 h. "AMBERJET" is a trademark of Rohm & Haas. |
| PFE F | Copolymer prepared as described for PFE D, with the exception that PFE F was copolymerized from 65.1 mol % TFE, 33.0 mol % PMVE and 1.9 mol % MV5CN |
| Catalyst A | Tetrabutylphosphonium 2-p-toluyl-1,1,1,3,3,3-hexafluoroisopropanoate, can be prepared as described for "TBPTHI2" in U.S. Pat. No. 8,906,821 |
| Catalyst B | 34 wt % Catalyst A on a SiO$_2$ carrier |

Cure Rheology

Cure rheology tests were carried out using uncured, compounded samples using a rheometer marketed under the trade designation PPA 2000 by Alpha technologies, Akron, OH, in accordance with ASTM D 5289-07 at 180° C. or 188° C., no pre-heat, 12 min elapsed time, and a 0.5 degree arc. Both the minimum torque ($M_L$) and highest torque attained during a specified period of time when no plateau or maximum torque ($M_H$) was obtained were measured. Also measured were the time for the torque to increase 2 units above $M_L$ (Ts'2), the time for the torque to reach a value equal to $M_L \pm 0.5(M_H - M_L)$, (T50), and the time for the torque to reach $M_L \pm 0.9(M_H - M_L)$, (T90). The results are summarized in Table 3 and Table 4.

Molding O-Ring and Compression Set Test

O-rings (SAE AS568-214) were mold at 177° C. for 10 min. The press-cured O-rings were post-cured using the following step cure procedure. For the examples in Table 3, the first cure step started at room temperature and was ramped to 150° C. for 1 h. It was held at 150° C. for 7 h. The second cure step started at 150° C. and was ramped to 300° C. for 2 h. It was held at 300° C. for 4 h. Then a cooling step started at 300° C. and was cooled to room temperature for 2 h.

For the examples in Table 4, the first cure step cure started at room temperature and was ramped to 250° C. for 2 hours. It was held at 250° C. for 2 hours. The second cure step started at 250° C. and was ramped to 325° C. for 2 hours. It was held at 325° C. for 10 hours. Then a cooling step started at 325° C. and was cooled to room temperature for 2 hours.

The post-cured O-rings were tested for compression set for 70 h at 200° C., 250° C. and 300° C. in accordance with ASTM D 395-03 Method B and ASTM D 1414-94 with 25% initial deflection for 200° C., 250° C. and 18% initial deflection for 300° C. Results are reported as percentages. The test results are summarized in Tables 3 and 4.

Metal Content Analysis

Metal content of PFE A through PFE F was measured by ICP-MS. The samples were dry-ashed followed by a ThermoFinnigan Element2 magnetic-sector ICP-MS analysis. The test results are summarized in Table 2.

Metal and silicon content of cured compound samples in Examples 1 to 9 and Comparative Examples 1 to 6 was measured by a Rigaku Supermmini 200 wavelength disperse X-ray fluorescence (WDXRF) using each MDR cured disk after testing cure rheology. SiO$_2$ content was calculated based on Si content using molecular weight of Si (28.09) and SiO$_2$ (60.08). The results are summarized in Tables 3 and 4.

Compounding

All perfluoroelastomer compounds used in Examples 1 through 9 (EX-1 through EX-9) and Counter Examples 1 through 6 (CE-1 through CE-6) were prepared using a 6 inch (15.24 cm), two roll mill by compounding the perfluoroelastomer indicated in Tables 3 and 4, and either 0.86 parts of Catalyst A or 2.5 parts of Catalyst B were used, as indicated in Table 3. For Examples 4 to 9 shown in Table 4, 0.7 parts of active catalyst was maintained while changing SiO$_2$ content in the formulations from 0 to 2.05 parts of the amount of Catalyst B, as indicated.

The cure characteristics were measured using an Alpha Technologies Rubber Process Analyzer with Moving Die Rheometer (MDR) mode under conditions corresponding to ASTM D5289-07. After O-rings were molded they were press-cured at 180° C. for 30 min in Table 3 and 188° C. for 10 min for Table 4. The press-cured O-rings were post-cured using the step cure as described above. The results are summarized in Tables 3 and 4.

TABLE 2

ICP-MS results for uncompounded perfluoroelastomers

|    | PFE A (ppm) | PFE B (ppm) | PFE C (ppm) | PFE D (ppm) | PFE E (ppm) | PFE F (ppm) |
|----|-------------|-------------|-------------|-------------|-------------|-------------|
| Li | <2    | <2    | <2    | <2    | <2    | <2    |
| Na | <8    | <8    | <8    | <8    | <8    | <8    |
| Mg | 101   | 109   | 90    | 1.0   | 1.1   | 1.9   |
| Al | 1     | 0.4   | 2     | <0.1  | <0.1  | 0.17  |
| P  | <0.5  | <0.5  | <0.5  | <0.5  | <0.5  | <0.5  |
| K  | <1    | <1    | <1    | <1    | <1    | <1    |
| Ca | <4    | <4    | 5     | <4    | <4    | <4    |
| Ti | <1    | <1    | <1    | <1    | <1    | <1    |
| V  | <0.1  | <0.1  | <0.1  | <0.1  | <0.1  | <0.1  |
| Cr | <0.1  | <0.1  | <0.1  | <0.1  | <0.1  | <0.1  |
| Mn | <0.1  | <0.1  | <0.1  | <0.1  | <0.1  | <0.1  |
| Fe | <4    | <4    | <4    | <4    | <4    | <4    |
| Co | <0.01 | <0.01 | <0.01 | <0.01 | <0.01 | <0.01 |
| Ni | <0.5  | <0.5  | <0.5  | <0.5  | <0.5  | <0.5  |
| Cu | <2    | <2    | <2    | <2    | <2    | <2    |
| Zn | <2    | <2    | <2    | <2    | <2    | <2    |
| Sr | <0.1  | <0.1  | <0.1  | <0.1  | <0.1  | <0.1  |
| Zr | <0.3  | <0.3  | <0.3  | <0.3  | <0.3  | <0.3  |
| Mo | <0.1  | <0.1  | <0.1  | <0.1  | <0.1  | <0.1  |
| Sn | <1    | <1    | <1    | <1    | <1    | <1    |
| Sb | <3    | <3    | <3    | <3    | <3    | <3    |

TABLE 4

|  | EX-4 | EX-5 | EX-6 | EX-7 | EX-8 | EX-9 |
|---|---|---|---|---|---|---|
| Formulation | | | | | | |
| PFE E | 100 | 100 | 100 | 100 | 100 | 100 |
| Catalyst A | 0.7 | 0.67 | 0.63 | 0.56 | 0.28 | 0 |
| Catalyst B | 0 | 0.1 | 0.21 | 0.41 | 1.23 | 2.05 |
| Cure rheology MDR 12 min @188° C. | | | | | | |
| $M_L$ (dNm) | 3.6 | 4.2 | 4.0 | 3.7 | 3.0 | 2.3 |
| $M_H$ (dNm) | 8.6 | 13.8 | 14.1 | 14.9 | 15.2 | 15.6 |
| Delta torque (dNm) | 5.0 | 9.5 | 10.2 | 11.3 | 12.2 | 13.3 |
| Ts'2 (min) | 1.2 | 0.7 | 0.7 | 0.7 | 0.7 | 1.3 |
| T50 (min) | 1.3 | 1.1 | 1.1 | 1.1 | 1.2 | 2.0 |
| T90 (min) | 4.1 | 2.8 | 2.7 | 2.8 | 3.1 | 5.0 |
| Tan d MH | 0.159 | 0.073 | 0.070 | 0.067 | 0.065 | 0.072 |
| WDXRF | | | | | | |
| Silicon (ppm) | 122 | 187 | 326 | 649 | 1,295 | 3,339 |
| $SiO_2$ (%) calc. | 0.03 | 0.04 | 0.07 | 0.14 | 0.28 | 0.71 |
| Compression set 70 hours (%) | | | | | | |
| 25% deflection @300° C. | 102.9 | 92.5 | 93.5 | 84.4 | 74.3 | 83.4 |

Various modifications and alterations of this disclosure may be made by those skilled the art without departing from the scope and spirit of the disclosure, and it should be understood that this disclosure is not to be unduly limited to the illustrative embodiments set forth herein.

TABLE 3

|  | EX-1 | EX-2 | EX-3 | CE-1 | CE-2 | CE-3 | CE-4 | CE-5 | CE-6 |
|---|---|---|---|---|---|---|---|---|---|
| Formulation | | | | | | | | | |
| PFE D | 100 | | | 100 | | | | | |
| PFE E | | 100 | | | 100 | | | | |
| PFE F | | | 100 | | | 100 | | | |
| PFE A | | | | | | | 100 | | |
| PFE B | | | | | | | | 100 | |
| PFE C | | | | | | | | | 100 |
| Catalyst A | 0.86 | 0.86 | 0.86 | | | | 0.86 | 0.86 | 0.86 |
| Catalyst B | | | | 2.5 | 2.5 | 2.5 | | | |
| Cure rheology MDR 12 min @177° C. | | | | | | | | | |
| $M_L$ (dNm) | 1.8 | 4.3 | 1.3 | 1.9 | 2.9 | 1.2 | 1.8 | 4.0 | 1.3 |
| $M_H$ (dNm) | 6.7 | 11.9 | 6.5 | 12.3 | 18.9 | 12.1 | 8.4 | 11.8 | 8.3 |
| Delta torque (dNm) | 4.9 | 7.7 | 5.2 | 10.4 | 15.9 | 10.9 | 6.6 | 7.8 | 7.0 |
| Ts'2 (min) | 3.3 | 1.0 | 3.4 | 2.4 | 2.1 | 2.7 | 1.4 | 0.8 | 2.2 |
| T50 (min) | 3.5 | 1.4 | 3.7 | 3.5 | 3.6 | 4.1 | 1.9 | 1.2 | 3.1 |
| T90 (min) | 8.2 | 4.6 | 8.4 | 7.5 | 7.5 | 8.8 | 5.8 | 4.4 | 8.1 |
| Tan d MH | 0.094 | 0.077 | 0.087 | 0.028 | 0.037 | 0.027 | 0.058 | 0.068 | 0.053 |
| WDXRF | | | | | | | | | |
| Silicon (ppm) | 50 | 53 | 60 | 5944 | 5452 | 5665 | 320 | 149 | 58 |
| $SiO_2$ (%) calc. | 0.01 | 0.01 | 0.01 | 1.27 | 1.17 | 1.21 | 0.07 | 0.03 | 0.01 |
| Compression set 70 h (%) | | | | | | | | | |
| 25% deflection @200° C. | 29 | 22 | 25 | 9 | 17 | 7 | 16 | 18 | 15 |
| 25% deflection @250° C. | 38 | 40 | SPLIT | 16 | 36 | 15 | 25 | 38 | SPLIT |
| 18% deflection @300° C. | 62 | 81 | 64 | 28 | 83 | 30 | 39 | 78 | 41 |

What is claimed is:

1. A composition comprising:
   a curable fluoropolymer comprising nitrogen-containing cure sites and wherein the curable fluoropolymer comprises a partially fluorinated emulsifier and wherein the amount of partially fluorinated emulsifier is less than 500 ppb; and
   a curative comprising an organo onium cation and an anion represented by Formula $$R-CF_2-\underset{R'}{\overset{CF_2-R}{\overset{|}{C}}}-O^- \text{ or }$$

$$\left[O^-\underset{Rf}{\overset{Rf}{\overset{|}{C}}}-X-\underset{Rf}{\overset{Rf}{\overset{|}{C}}}-O^-\right]_n,$$

wherein
each R and R' is independently hydrogen, halogen, alkyl, aryl, arylalkylenyl, or alkylarylenyl, wherein the alkyl, aryl, arylalkylenyl, or alkylarylenyl each may be unsubstituted or each may be substituted by one or more halogens, with the proviso that R' is not halogen, or R and R' can join together to form a ring;
each Rf is $RCF_2$— or a perfluoroalkyl group having up to 8 carbon atoms;
X is an organic linking group that is nonfluorinated or at least partially fluorinated; and n is 1 or 2,
wherein the composition is free of metal cations or comprises not more than 20 parts per million metal cations, and wherein the composition is free of silicon dioxide or comprises less than 0.5 percent by weight silicon dioxide, based on the total weight of the composition.

2. The composition of claim 1, wherein if the composition comprises a fluorinated acid or salt thereof having 4 to 18 carbon atoms, the composition comprises not more than 2 ppm of the fluorinated acid or salt thereof.

3. The composition of claim 1, wherein the curable fluoropolymer is an amorphous, curable fluoropolymer, and wherein the composition further comprises a partially crystalline fluoropolymer.

4. The composition of claim 1, wherein the composition consists of:
   the curable fluoropolymer comprising nitrogen-containing cure sites; and
   the curative comprising an organo onium cation and an anion represented by Formula $$R-CF_2-\underset{R'}{\overset{CF_2-R}{\overset{|}{C}}}-O^- \text{ or }$$

$$\left[O^-\underset{Rf}{\overset{Rf}{\overset{|}{C}}}-X-\underset{Rf}{\overset{Rf}{\overset{|}{C}}}-O^-\right]_n,$$

wherein
each R and R' is independently hydrogen, halogen, alkyl, aryl, arylalkylenyl, or alkylarylenyl, wherein the alkyl, aryl, arylalkylenyl, or alkylarylenyl each may be unsubstituted or each may be substituted by one or more halogens, with the proviso that R' is not halogen, or R and R' can join together to form a ring;
each Rf is $RCF_2$— or a perfluoroalkyl group having up to 8 carbon atoms;
X is an organic linking group that is nonfluorinated or at least partially fluorinated; and n is 1 or 2.

5. The composition of claim 4, wherein the curable fluoropolymer is an amorphous, curable fluoropolymer.

6. The composition of claim 3, wherein the composition consists of:
   the amorphous, curable fluoropolymer comprising nitrogen-containing cure sites;
   the partially crystalline fluoropolymer; and
   the curative comprising an organo onium cation and an anion represented by Formula $$R-CF_2-\underset{R'}{\overset{CF_2-R}{\overset{|}{C}}}-O^- \text{ or }$$

$$\left[O^-\underset{Rf}{\overset{Rf}{\overset{|}{C}}}-X-\underset{Rf}{\overset{Rf}{\overset{|}{C}}}-O^-\right]_n,$$

wherein
each R and R' is independently hydrogen, halogen, alkyl, aryl, arylalkylenyl, or alkylarylenyl, wherein the alkyl, aryl, arylalkylenyl, or alkylarylenyl each may be unsubstituted or each may be substituted by one or more halogens, with the proviso that R' is not halogen, or R and R' can join together to form a ring;
each Rf is $RCF_2$— or a perfluoroalkyl group having up to 8 carbon atoms;
X is an organic linking group that is nonfluorinated or at least partially fluorinated; and n is 1 or 2.

7. The composition of claim 6, wherein each R is F, and wherein R' is hydrogen, phenyl, methoxyphenyl, toluyl, fluorophenyl, trifluoromethylphenyl, or trifluoromethyl.

8. The composition of claim 6, wherein the curable fluoropolymer comprises interpolymerized units of tetrafluoroethylene and at least one of a different perfluorinated olefin, a partially fluorinated olefin, a non-fluorinated olefin, a perfluoroalkylvinylether, or a perfluoroalkoxyalkylvinylether.

9. The composition of claim 8, wherein the interpolymerized units further comprise at least one of perfluoro(8-cyano-5-methyl-3,6-dioxa-1-octene), $CF_2=CFO(CF_2)_L CN$, $CF_2=CFO(CF_2)_u OCF(CF_3)CN$, $CF_2=CFO[CF_2CF(CF_3)O]_q(CF_2O)_y CF(CF_3)CN$, or $CF_2=CF[OCF_2CF(CF_3)]_t O(CF_2)_r CN$, wherein L is in a range from 2 to 12; u is in a range from 2 to 6; q is in a range from 0 to 4; y is in a range from 0 to 6; r is in a range from 1 to 2; and t is in a range from 1 to 4.

10. A fluoroelastomer prepared by curing the composition of claim 1.

11. A method of making a fluoroelastomer article, the method comprising:
   providing the composition of claim 1,
   shaping the composition; and
   crosslinking the composition to form the fluoroelastomer article.

12. The method of claim 11, wherein crosslinking comprises heating the composition in an environment with a temperature set higher than 300° C.

13. A process for making the composition of claim 1, the process comprising:
   providing an aqueous composition containing particles of the curable fluoropolymer;
   coagulating the curable fluoropolymer by at least one of contacting the aqueous composition with a mineral acid or by freeze coagulation;
   isolating the curable fluoropolymer; and
   combining the curable fluoropolymer with the curative.

14. The composition of claim 1, wherein each R is F, and wherein R' is hydrogen, phenyl, methoxyphenyl, toluyl, fluorophenyl, trifluoromethylphenyl, or trifluoromethyl.

15. The composition of claim 1, wherein the organo onium cation is a tetraalkylphosphonium cation or a tetraalkylammonium cation.

16. The composition of claim 1, wherein the curative is tetrabutylphosphonium 2-p-toluyl-1,1,1,3,3,3-hexafluoroisopropanolate.

17. The composition of claim 1, wherein the curable fluoropolymer comprises interpolymerized units of tetrafluoroethylene and at least one of a different perfluorinated olefin, a partially fluorinated olefin, a non-fluorinated olefin, a perfluoroalkylvinylether, or a perfluoroalkoxyalkylvinylether.

18. The composition of claim 1, wherein the composition comprises not more than 5 parts per million metal cations.

19. The composition of claim 1, wherein the curable fluoropolymer is an amorphous, curable fluoropolymer, and wherein the composition further comprises (i) a melt-processable copolymer of TFE and perfluorinated ethers (PFA), (ii) a melt processable copolymer of TFE and HFP (FEP), (iii) partially crystalline polymers of TFE and ethylene (ET) (ETFE), (iv) tetrafluoroethylene, hexafluoropropylene, and vinylidene fluoride (THV), or (v) combinations thereof.

* * * * *